United States Patent
Hirata et al.

(10) Patent No.: US 6,384,141 B2
(45) Date of Patent: May 7, 2002

(54) ANTI-SHRINKAGE AGENT FOR HYDRAULIC MATERIAL

(75) Inventors: Tsuyoshi Hirata, Kobe; Koichiro Nagare, Kawasaki, both of (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/749,619

(22) Filed: Dec. 28, 2000

(30) Foreign Application Priority Data

Dec. 28, 1999 (JP) .............................. 11-375398

(51) Int. Cl.$^7$ .............................. C08L 71/02; C08J 3/03; C04B 14/00
(52) U.S. Cl. .............................. 525/187; 525/531; 524/5; 106/729
(58) Field of Search .............................. 106/729; 524/5; 525/531, 187

(56) References Cited

U.S. PATENT DOCUMENTS

| | | | |
|---|---|---|---|
| 4,528,334 A | 7/1985 | Knopf et al. | 525/404 |
| 5,556,460 A | 9/1996 | Berke et al. | |
| 5,660,626 A | 8/1997 | Ohta et al. | 106/810 |
| 5,739,212 A * | 4/1998 | Wutz et al. | 525/411 |

FOREIGN PATENT DOCUMENTS

| | | |
|---|---|---|
| EP | 0 271 435 A2 | 6/1988 |
| EP | 0 725 044 A1 | 8/1996 |
| EP | 11-512385 | 10/1999 |
| JP | 7-53645 | 2/1995 |
| JP | 7-53993 | 2/1995 |
| JP | 8-208769 | 8/1996 |
| JP | 8-208770 | 8/1996 |
| JP | 08-268741 | 10/1996 |
| JP | 9-192691 | 7/1997 |
| JP | 10-192891 | 7/1998 |
| JP | 11-60652 | 3/1999 |
| JP | 11-80288 | 3/1999 |
| JP | 11-079817 | 3/1999 |
| JP | 11-39855 | 5/1999 |
| JP | 11-171939 | 6/1999 |
| JP | 11-279220 | 10/1999 |

* cited by examiner

Primary Examiner—James J. Seidleck
Assistant Examiner—Olga Asinovsky
(74) Attorney, Agent, or Firm—Connolly Bove Lodge & Hutz LLP

(57) ABSTRACT

The present invention is related to a shrinkage reducing agent for hydraulic materials which comprises at least one polymer selected from the group consisting of (a) a polymer having a structure derived from the residue of a compound containing 2 to 30 carbon atoms and one active hydrogen atom by the binding thereto of one oxyalkylene chain having a carboxyl-containing side chain, (b) a polymer having a structure derived from the residue of a compound containing 4 to 30 carbon atoms and two active hydrogen atoms by the binding thereto of at least one oxyalkylene chain having a carboxyl-containing side chain, (c) a polymer having a structure derived from the residue of a compound containing 1 to 30 carbon atoms and at least three active hydrogen atoms by the binding thereto of at least one oxyalkylene chain having a carboxyl-containing side chain and (d) a polymer having a structure derived from the residue of an amine by the binding thereto one oxyalkylene chain having a carboxyl-containing side chain.

9 Claims, No Drawings

ANTI-SHRINKAGE AGENT FOR HYDRAULIC MATERIAL

FIELD OF THE INVENTION

The present invention relates to a shrinkage reducing agent for hydraulic materials, a method of producing the same and an additive composition for hydraulic materials.

PRIOR ART

Hydraulic materials can give cured produces excellent in strength and durability, among others, and therefore are in wide use in the form of cement compositions such as cement pastes, mortar and concrete. They are now indispensable in building civil engineering and architectural structures. Such hydraulic materials, however, have a problem. After curing, the unreacted water remaining in the inside disperses according to ambient temperature, moisture and other conditions and drying shrinkage progresses presumably due to such moisture dissipation to cause cracks to appear in cured products, lowering the strength and durability thereof. Decreases in strength and durability of civil engineering and architectural structures produce serious problems such as endangered safety and increased repairing costs.

The government regulations with respect to these problems are going to be tightened. For instance, the Japanese law concerning the promotion of assurance of the quality of houses as enacted in June, 1999 includes concrete cracking among the defects to be repaired. Further, in Japan, there is the possibility of specifications, with respect to cracking due to drying shrinkage, for performance-oriented ready mixed concrete being introduced into JIS A 5308 in or after 2005. Under the circumstances, the importance of shrinkage reducing agents for hydraulic materials which prevent the progress of shrinkage due to drying of cured hydraulic materials has been well recognized and various technological innovations have been made.

Thus, the following agents have been disclosed for reducing the shrinkage of cement mixes upon drying. $C_{1-4}$ alcohol-alkylene oxide adducts (Japanese Kokoku Publication Sho-56-51148), dihydric to octahydric alcohol-ethylene oxide and propylene oxide coadducts (Japanese Kokoku Publication Hei-01-53214), lower alkylamine-alkylene oxide adducts (Japanese Kokoku Publication Hei-01-35215), polypropylene glycol species in the range of oligomers (Japanese Kokai Publication Sho-59-152253), low-molecular-weight alcohols (Japanese Kokoku Publication Hei-06-6500) and $C_8$ 2-ethylhexanol-alkylene oxide adducts (JP2825855), among others. All these compounds are oligomers or low-molecular compounds with a molecular weight of not more than about 1,000.

Among them, those shrinkage reducing agents which have been put into practice use and are commercially available are reviewed, for example, in "Konkurito Konwazai no Kaihatsu to Saishin Gijutu (Development and State-of-the-art Technologies of concrete Admixtures)" (first edition, published Sep. 18, 1995 by CMC Co.). However, the standard addition amounts of these shrinkage reducing agents are as high as 2 to 6% on the unit cement content basis, so that when used in concrete, they increase the cost of concrete and can never be said to be general purpose agents.

Meanwhile, as regards high-molecular-weight agents for reducing shrinkage due to drying, Japanese Kokai Publication Hei-08-268741 discloses a cement dispersing agent of the drying shrinkage reducing type which comprises a graft polymer derived from a polycarboxylic acid (or a salt thereof) by the chemical bonding of an oligoalkylene glycol or polyhydric alcohol to side chains thereof. However, this is not easy to synthesize.

For obtaining high-molecular-weight compounds with ease, there are known methods which comprise graft polymerizing an ethylenically unsaturated monomer onto a polyether compound. Laid-open European Patent Application No. 0271435 (A2) discloses the use of a graft polymer constituted of a main chain polyether polymer and a side chain polymer resulting from polymerization of an unsaturated ethylenic monomer as a superplasticizer or water reducing agent for cement compositions and Japanese Kokai Publication Hei-11-139855 discloses the use, as a cement additive, of a graft polymer comprising a specific monomer and having a weight average molecular weight of not less than 6,000. However, these graft polymers are intended to improve the strength and other properties of cured cement products by reducing water and curing cement compositions while maintaining the flowability thereof. Nothing is disclosed at all therein of the use thereof as agents a for reducing drying shrinkage. Therefore, there was a room for studying in order to readily produce agents capable of satisfactorily suppressing the progress of shrinkage due to drying even when the addition amount thereof in hydraulic materials is reduced.

SUMMARY OF THE INVENTION

Accordingly, it is an object of the present invention, which has been made in view of the state of the art mentioned above, to provide a shrinkage reducing agent for hydraulic materials high in general versatility and capable of producing a better cracking preventing effect by sufficiently preventing the progress of drying shrinkage of cured products even when the addition amount thereof in hydraulic materials is reduced to thereby cut down the cost of production of hydraulic materials, a method of producing the same, and an additive composition for hydraulic materials.

The present inventors made intensive investigations following careful studying of the problems concerning the shrinkage reducing agents for hydraulic materials which could be used widely in the fields of civil engineering and architecture and, as a result, encountered the fact that a shrinkage reducing agent for hydraulic materials which comprises a polymer having a specific structure can produce an excellent cracking preventing effect by sufficiently suppressing the progress of shrinkage due to drying of cured products even when used at a reduced addition amount to thereby reduce the production cost of hydraulic materials, hence can produce a dramatic effect, increasing the general versatility, improving the safety of civil engineering and architectural structures and suppressing the repairing costs, and have now completed the present invention.

Thus, the present invention lies in a shrinkage reducing agent for hydraulic materials
which comprises at least one polymer selected from the group consisting of
(a) a polymer having a structure derived from the residue of a compound containing 2 to 30 carbon atoms and one active hydrogen atom by the binding thereto of one oxyalkylene chain having a carboxyl-containing side chain,
(b) a polymer having a structure derived from the residue of a compound containing 4 to 30 carbon atoms and two active hydrogen atoms by the binding thereto of at least one oxyalkylene chain having a carboxyl-containing side chain, (c) a polymer having a structure derived from the residue of a compound containing 1 to 30 carbon atoms and at least three active hydrogen atoms by the binding thereto of at least one oxyalkylene chain having a carboxyl-containing side chain and (d) a polymer having a structure derived from the residue of an amine by the binding thereto of one oxyalkylene chain having a carboxyl-containing side chain.

DETAILED DESCRIPTION OF THE INVENTION

In the following, the invention is described in detail.

The shrinkage reducing agent of the invention for hydraulic materials comprises at least one polymer selected from the group consisting of the above-mentioned polymer (a), polymer (b), polymer (c) and polymer (d). Although it may contain another component or other components, it preferably comprises the above-mentionedpolymer(s) as a main component(s) These polymers may be used singly or two or more of them may be used in combination. When two or more polymers are used, the weight proportions of the respective polymers are not particularly restricted.

Referring to the above polymers (a), (b) and (c), the term "residue of a compound containing an active hydrogen atom(s)" means a group having a structure resulting from removal of the active hydrogen atom(s) from the active hydrogen-containing compound. The group(s) formed upon reaction with the active hydrogen-containing compound is(are) not particularly restricted. Preferred as such group s)r alcohol residues having a structure resulting from removal of an active hydrogen atom(s) from the hydroxy group(s) of alcohols. Further, there may be mentioned, among others, carboxylic acid residues having a structure resulting from removal of an active hydrogen atom(s) from the carboxyl group(s) of carboxylic acids. As the active hydrogen-containing compound, there may be mentioned compounds having one, two or three active hydrogen atoms. Referring to the above polymer (d), the "amine residue" means a group having a structure resulting from the removal of a hydrogen atom(s) from a substituent(s) on the nitrogen atom of the amine or a group having a structure resulting from the removal of a hydrogen atom(s) on the nitrogen atom of ammonia or the amine, without being particularly limited to the groups formed upon reaction with ammonia or the amine.

Referring to the above polymers, the oxyalkylene chain having a carboxyl-containing side chain is not particularly restricted but may comprise one single species or two or more species. Preferred are, for example, structures having a repeating unit represented by the general formula (1):

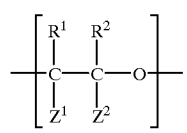

(1)

wherein $R^1$ and $R^2$ are the same or different and each represents a hydrogen atom or a hydrocarbon group containing 1 to 18 carbon atoms or a carboxyl-containing side chain and $Z^1$ and $Z^2$ are the same or different and each represents a hydrogen atom or a carboxyl-containing side chain. It is essential, however, that the above repeating unit comprise a carboxyl-containing side chain. It is preferred that such repeating unit be a main component of the oxyalkylene chain. The chain may also comprise another or other repeating units. It is preferred that one of $R^1$ and $R^2$ be a hydrogen atom and the other be a hydrogen atom or a hydrocarbon group containing 1 to 18 carbon atoms.

The above polymers comprise a structure resulting from the binding of an oxyalkylene chain to the residue of an active hydrogen-containing compound containing a specified number of carbon atoms and/or the amine residue and a carboxyl-containing side chain or chains. The side chains have a structure resulting from polymerization of an ethylenically unsaturated monomer component(s) comprising an unsaturated carboxylic acid monomer as an essential component. Such polymers can be produced by a step of producing polymers by graft polymerization of an ethylenically unsaturated monomer(s) comprising an unsaturated carboxylic acid monomer as an essential component onto polyether compounds, as mentioned later herein. The polymers obtained by graft polymerization of an unsaturated carboxylic acid monomer(s) onto polyether compounds have a carboxyl group(s) on their side chains and it is considered that the polymers be adsorbed on hydraulic materials through the ionic force owing to such a carboxyl group, although the force is weak, or that they chelate the cations on the surface of hydraulic materials or the cations eluted. Although the principle on which such a carboxyl group functions and contributes to shrinkage reduction in cured hydraulic material products is not uncertain, the action sufficiently suppressing the progress of drying shrinkage of cured products (hereinafter referred to as "shrinkage reducing ability") is surprisingly improved remarkably when the above ethylenically unsaturated monomer component comprises an unsaturated carboxylic acid monomer as an essential component.

The hydrophilicity and hydrophobicity of the above polymers are not particularly restricted so long as the effects of the present invention are produced. However, when the hydrophobicity is excessive, the amount of air in concrete may be reduced to an excessive extent, hence the adjustment of the amount of air may become difficult. When the hydrophilicity is excessive, an excessive amount of air may be entrained, so that it may possibly become difficult as well to adjust the amount of air to an appropriate level. The hydrophilicity and hydrophobicity of the above polymers can be adjusted, for example, by selecting an appropriate oxyalkylene chain structure.

While the above polymers are not particularly restricted in weight average molecular weight (Mw), a weight average molecular weight of 200 to 1,000,000 as determined by gel permeation chromatography (hereinafter referred to as "GPC"), for instance, is preferred. More preferably, it is 500 to 500,000, still more preferably, 1,000 to 100,000. The molecular weight distribution (Mw/Mn) is not particularly restricted but is preferably 1.5 to 100, for instance, more preferably 2 to 80, still more preferably 3 to 50. The molecular weight distribution of the polymers is the value obtained by dividing the weight average molecular weight (Mw) by the number average molecular weight (Mn).

In the present specification, the term "molecular weight" means the value determined by gel permeation chromatography (GPC), for instance. In the gel permeation chromatography (GPC), it is preferred that the working curve constructed by using commercially available polyethylene glycols as standard samples can be approximated by an expression of the third order at least within the range of 1,000 to 100,000 and that the correlation coefficient (r) of the approximation equation be not less than 0.99, more preferably not less than 0.999, still more preferably not less than 0.9999, The mobile phase is selected so that it can dissolve the sample. For accurate molecular weight determination, the working curve is preferably constructed by using a largest possible number of standard samples and, for that purpose, 5 or more standard samples should be used. On that occasion, one point for each of a molecular weight not more than 1,500 and a molecular weight not less than 150,000 should be included so that the reliability of the molecular weight determined can be guaranteed.

The invention is also directed to a method of producing the above-mentioned shrinkage reducing agent for hydraulic materials which comprises the step of producing a polymer by graft polymerization of an ethylenically unsaturated monomer component comprising an unsaturated carboxylic acid monomer as an essential component onto a polyether compound. By this method, it becomes possible to produce, in a simple and easy manner, those shrinkage reducing agents for hydraulic materials which produce the effects of the present invention.

In the following, referring to the method of producing the shrinkage reducing agents for hydraulic materials according to the invention, the ethylenically unsaturated monomer component, polyether compound and polymer production method are described in detail.

[Ethylenically Unsaturated Monomer Component]

The unsaturated carboxylic acid monomer in the ethylenically unsaturated monomer component has at least one polymerizable unsaturated bond and at least one carboxyl group and preferably comprises an unsaturated monocarboxylic acid monomer and an α, β-unsaturated dicarboxylic acid monomer and/or the anhydride thereof as essential components. They may each comprise a single component or a combination of two or more components. By using the α, β-unsaturated dicarboxylic acid monomer and/or the anhydride thereof, that rapid viscosity increase due to the uncontrolled progress of the polymerization reaction can be prevented. The content of the unsaturated carboxylic acid monomer in the ethylenically unsaturated monomer component is not particularly restricted so long as the effects of the present invention are produced. It is preferred that said monomer be contained as a main component, with or without another or other components.

As the unsaturatedmonocarboxylic acid monomer, there may be mentioned, among others, (meth)acrylic acid, crotonic acid, tiglic acid, 2-methylcrotonic acid and 2-methyl-2-pentenoic acid. Among them, (meth)acrylic acid is preferred because of its ready availability.

As the α, β-unsaturated dicarboxylic acid monomer and/or the anhydride thereof, there may be mentioned, among others, α, β-unsaturated dicarboxylic acids such as maleic acid, fumaric acid, mesaconic acid and citraconic acid; α, β-unsaturated dicarboxylic acid anhydrides such as maleic Haanhydride and citraconic anhydride. Among them, at least one compound selected from the group consisting of maleic acid, fumaric acid and maleic anhydride is preferred from the ready availability viewpoint.

For effecting the graft polymerization onto a polyether compound at an appropriate rate while preventing the viscosity from increasing, for instance, the content of the α, β-unsaturated dicarboxylic acid monomer and/or the anhydride thereof in the unsaturated carboxylic acid monomer is preferably 0.1 to 99.9% by weight, more preferably 1 to 99% by weight, still more preferably 10 to 90% by weight, most preferably 20 to 80% by weight.

In a preferred mode of practice of the invention, the ethylenically unsaturated monomer component comprises an α, β-unsaturated dicarboxylic acid monomer and (meth)acrylic acid. In such a mode of practice, the weight ratio between the α, β-unsaturated dicarboxylic acid monomer and (meth)acrylic acid is preferably 1/99 to 99/1, more preferably 10/90 to 90/10, still more preferably 20/80 to 80/20, most preferably 30/70 to 70/30.

As the ethylenically unsaturated monomer other than the unsaturated carboxylic acid monomer capable of being included in the ethylenically unsaturated monomer component, there may be mentioned ethylenically unsaturated carboxylic acid esters and other ethylenically unsaturated monomers. These may be used singly or a plurality thereof may be used.

As the ethylenically unsaturated carboxylic acid esters, there may be mentioned, among others, maleic acid alkyl esters such as monomethyl maleate, dimethyl maleate, monoethyl maleate and diethyl maleate; fumaric acid alkyl esters such as monomethyl fumarate, dimethyl fumarate, monoethyl fumarate and diethyl fumarate; alkyl (meth) acrylates such as methyl (meth)acrylate, ethyl (meth) acrylate, butyl (meth)acrylate and stearyl (meth)acrylate; hydroxy-containing unsaturated carboxylic acid esters, for example hydroxyalkyl (meth)acrylates such as hydroxyethyl (meth)acrylate and hydroxypropyl (meth)acrylate; and polyalkylene glycol (meth)acrylates such as (methoxy) polyethylene glycol (meth)acrylate, phenoxypolyethylene glycol (meth)acrylate, naphthoxypolyethylene glycol (meth) acrylate, monophenoxypolyethylene glycol maleate and carbazole-polyethylene glycol (meth)acrylate.

As the ethylenically unsaturated monomers other than the above ethylenically unsaturated carboxylic acid esters, there may be mentioned, among others, the following.

Aromatic vinyl monomers such as styrene; amido-containing vinyl monomers such as (meth)acrylamide and (meth)acrylalkylamides; vinyl esters such as vinyl acetate, vinyl propionate, vinyl pivalate, vinyl benzoate and vinyl cinnamate alkenes such as ethylene and propylene; dienes such as butadiene and isoprene; trialkyloxysilyl-containing vinyl monomers such as vinyltrimethoxysilane and vinyltriethoxysilane; silicon-containing vinyl monomers such as γ-(methacryloyloxypropyl)trimethoxysilane; maleimide derivatives such as maleimide, methylmaleimide, ethylmaleimide, propylmaleimide, butylmaleimide, octylmaleimide, dodecylmaleimide, stearylmaleimide, phenylmaleimide and cyclohexylmaleimide;

nitrile group-containing vinyl monomers such as (meth) acrylonitrile; aldehyde group-containing vinyl monomers such as (meth)acrolein; amino-containing vinyl monomers, for example dialkylaminoethyl (meth)acrylates such as dimethylaminoethyl (meth)acrylate; unsaturated ethers such as (methoxy)polyethylene glycol (meth)allyl ether and (methoxy)polyethylene glycol isopropenyl ether; sulfo-containing vinyl monomers such as 2-acrylamido-2-methylpropanesulfonic acid, (meth)allylsulfonic acid, 2-sulfoethyl (meth)acrylate, vinylsulfonic acid, hydroxyallyloxypropanesulfonic acid and styrenesulfonic acid; and other functional group-containing vinyl monomers such as vinyl chloride, vinylidene chloride, allyl chloride, allyl alcohol, vinylpyrrolidone and ethyl vinyl ether.

[Polyether Compound]

The polyether compound preferably comprises at least one member selected from the group consisting of alkylene oxide adducts of a compound containing 2 to 30 carbon atoms and one active hydrogen atom, alkylene oxide adducts of a compound containing 4 to 30 carbon atoms and two active hydrogen atoms, alkylene oxide adducts of a compound containing 1 to 30 carbon atoms and at least three active hydrogen atoms and alkylene oxide adducts of an amine, among others. Although it may further comprise another or other constituents, it preferably comprises such an alkylene oxide adduct or adducts as main constituents. The alkylene oxide adducts may be used singly or two or more of them may be used combinedly.

The above-mentioned alkylene oxide adducts can be prepared, for example, by polymerization, by a method known in the art, of an alkylene oxide onto an active hydrogen-containing compound and have a structure such that one oxyalkylene chain is bound to the residue of a compound containing 2 to 30 carbon atoms and one active hydrogen atom, a structure such that at least one oxyalkylene chain is bound to a residue of a compound containing 4 to 30 carbon atoms and two active hydrogen atoms, a structure such that at least one oxyalkylene chain is bound to a residue of a compound containing 1 to 30 carbon atoms and three or more active hydrogen atoms, or a structure such that one oxyalkylene chain is bound to an amine residue. That terminus of each oxyalkylene chain not bound to the residue of an active hydrogen-containing compound or to an amine residue has a structure such that it is bound to a hydrogen atom, a monovalent metal atom, a divalent metal atom, an ammonium group, an organic amine group, a hydrocarbon group containing 1 to 30 carbon atoms, an oxo-hydrocarbon group, an amido-hydrocarbon group, a carboxyl hydrocarbon group, a sulfonyl(hydrocarbon) group containing 0 to 30 carbon atoms or the like. When there are two or more oxyalkylene chains in each molecular, they may have the same terminal structure or different terminal structures. Among these terminal structures, the structure bound to a hydrogen atom or a hydrocarbon group containing 1 to 30 carbon atoms is preferred from the general versatility viewpoint.

As the alkylene oxide, there maybe mentioned, for example, ethylene oxide, propylene oxide, butylene oxide and styrene oxide. Among them, the use of ethylene oxide and/or propylene oxide, together with another alkylene oxide, as necessary, is preferred from the general versatility viewpoint. These may be used singly or two or more of them may be used to realize an addition mode such as block addition, alternate addition or random addition, for instance.

The active hydrogen-containing compound preferably comprises at least one species selected from the group consisting of monohydric alcohols containing 2 to 30 carbon atoms, dihydric alcohols containing 4 to 30 carbon atoms, tri- and polyhydric alcohols containing 1 to 20 carbon atoms and amines and may contain a carboxylic acid or the like as necessary. These may be used singly or two or more of them may be used combinedly. Among them, those alcohols which are relatively inexpensive and readily available are preferred from the general versatility viewpoint, and monohydric alcohols containing 2 to 30 carbon atoms are more preferred.

The above monohydric alcohols containing 2 to 30 carbon atoms include, among others, $C_{2-22}$ primary alcohols such as ethanol, n-propanol, n-butanol, n-pentanol, n-hexanol, n-heptanol, 2-ethylbutanol, n-octanol, 1-dodecanol, 1-octadecanol, 2-ethylhexanol, cyclohexanol, allyl alcohol and 3-methyl-3-buten-1-ol; $C_{3-18}$ secondary alcohols such as isopropyl alcohol, 2-butanol, 2-pentanol, 3-pentanol, 2-heptanol, 3-heptanol, methylamyl alcohol, 2-ocatnol, nonyl alcohol and $C_{12-14}$ alcohols obtained by oxidation of n-paraffins; and tertiary alcohols such as tert-butanol and tert-pentanol. Among them, those containing 3 to 12 carbon atoms are preferred and those containing 3 to 10 carbon atoms are more preferred.

The $C_{4-30}$ dihydric alcohols include, among others, 1,4-butanediol, hexylene glycol and 2,2-diethyl-1,3-propanediol.

The $C_{1-30}$ tri- and polyhydric alcohols include, among others, glycerol, trimethylolpropane, 1,3,5-pentanetriol, pentaerythritol, glucose, fructose, sorbitol, gluconic acid, tartaric acid and polyvinyl alcohol.

The amines include, but are not particularly restricted to, ammonia, methylamine, ethylamine, ethylenediamine, diethylenetriamine, triethylenetetramine, propylamine, butylamine, 2-ethylbutylamine, octylamine, dimethylamine, dinropylamine, dimethylethanolamine, dibutylamine, trimethylamine, triethylamine, allylamine, cyclobutylamine, cyclohexylamine, laurylamine, aniline, diphenylamine, urea, thiourea and polyethylenimine, among others.

The carboxylic acids include, among others, monocarboxylic acids such as valeric acid, caproic acid, enanthic acid, caprylic acid, lauric acid, stearic acid, oleic acid, elaidic acid and erucic acid; dicarboxylic acids such as malonic acid, succinic acid, glutaric acid and adipic acid; and hydroxycarboxylic acids such as lactic acid, tartaric acid, citric acid and malic acid.

The method of polymerization in preparing the alkylene oxide adducts is not particularly restricted but the use of a conventional method of polymerization, among others, is preferred from the general versatility viewpoint, and the method using an acid catalyst or an alkali catalyst is preferred. As the acid catalyst, for instance, there may be mentioned metal and semimetal halides, which are Lewis acid catalysts, such as boron trifluoride; and inorganic acids such as hydrogen chloride, hydrogen bromide and sulfuric acid and, as the alkali catalyst, there may be mentioned potassium hydroxide, sodium hydroxide, sodium hydride and the like.

The polyether compound mentioned above may be a derivative from such an alkylene oxide adduct as mentioned above. Such derivative is not particularly restricted but includes, among others, terminal group modification products obtained by conversion of the terminal functional groups of a polyether compound and crosslinked products obtained by reacting a polyether compound with a crosslinking agent having a plurality of carboxyl, isocyanate, amino, halogen or like groups in each molecule.

As the terminal group modification products mentioned above, there may be mentioned, for example, the products obtained by converting all or part of the terminal hydroxy groups of a polyether compound by (1) esterification with a fatty acid containing 2 to 22 carbon atoms or a dicarboxylic acid (anhydride), such as succinic acid, succinic anhydride, maleic acid, maleic anhydride and adipic acid, (2) alkoxylation using an alkyl halide in the manner of hydrogen halide eliminating reaction, namely to alkoxypolyalkylene glycols, or (3) sulfation with a sulfating agent known in the art, such as chlorosulfonic acid, sulfuric anhydride and sulfamic acid, namely to polyoxyalkylene sulfates (salts).

The weight average molecular weight of the above polyether compound is not particularly restricted but preferably is 100 to 1,000,000, for instance, more preferably 200 to 100,000, still more preferably 300 to 50,000. The molecular weight distribution thereof is not particularly restricted, either, but preferably is, for example, 1 to 100, more preferably 1.1 to 10, still more preferably 1.1 to 3.

Since the above polyether compound is used as a starting material for the polymer of the present invention, the balance between hydrophilicity and hydrophobicity of such polyether compound strongly influences the balance between hydrophilicity and hydrophobicity of the resulting polymer. When the hydrophobicity of the polymer is excessive, the amount of air in concrete is excessively reduced and accordingly it becomes difficult to control the amount of air. Conversely, when the hydrophilicity of the polymer is excessive, an excessive amount of air is entrained in the hydraulic material and it becomes difficult to adjust the amount of air to an appropriate level. Therefore, in the practice of the invention, it is of particular significance to balance the hydrophilicity of the polyether compound with the hydrophobicity thereof. As an index indicative of such balance between hydrophilicity and hydrophobicity, there is the HLB. Several attempts have been made to express the HLB in a numerical form. In the practice of the invention, however, the value calculated according to Davis' formula described in Susumu Tsuji: "Nyuka Kayoka no Gijutsu (Techiques of Emulsification and Solubuilization)" (8th edition, published Oct. 30, 1992 by Kogaku Tosho) is employed.

The HLB of the above polyether compound is preferably 1 to 15, for instance, more preferably 2 to 12, still more preferably 3 to 9.

As commercially available species of the polyether compound, there maybe mentioned alcohol-alkylene oxide adducts, for example Newpoul LB 50HB series (trademark, products of SANYO CHEMICAL), which are primary alcohol-alkylene oxide adducts, Softanol series (trademark, products of Nippon Shokubai), which are $C_{12-14}$ secondary alcohol-alkylene oxide adducts, and members of Jeffamine M series (trademark, products of San Techno Chemical), which are amine-terminated polyethers, among others.

[Method of Polymer Production]

The graft polymerization for preparing the polymers of the present invention is carried out in the manner of addition polymerization of an ethylenically unsaturated monomer with a grafting site generated upon abstraction of a hydrogen or halogen atom from the polyether compound serving as the site of initiation of polymerization.

In the above graft polymerization, some molecules of the polyether compound may have a number of grafting sites and others may have no grafting site. When a plurality of atoms are abstracted from one and the same carbon atom, the polyether chain is cleaved at that site. The polymerization of an ethylenically unsaturated monomer is terminated by chain transfer, disproportionation or recombination, among others. In some cases, mutual binding of molecules of the polyether compound gives the dimer, trimer and so forth of the polyether compound. Therefore, it is presumable that the molecular weight distribution of the hydrophilic graft polymer obtained is broadened, hence the distribution (Mw/Mn) increases.

The method to be used in the above graft polymerization is not particularly restricted provided that the ethylenically unsaturated monomer can be graft-polymerized onto the polyether compound. For example, the polymerization is preferably carried out in the presence of apolymerization initiator since, in this case, the shrinkage reducing ability of the hydrophilic graft polymer can be improved by increasing the graft ratio.

The polymerization initiator is not particularly restricted but, for example radical initiators known in the art may be used. From the reactivity viewpoint, among others, organic peroxides are preferred, however.

The organic peroxides are not particularly restricted but, include, among others, those mentioned below under (1) to (8). These may be used singly or two or more of them may be used combinedly.

(1) Ketone peroxides: methyl ethyl ketone peroxide, cyclohexanone peroxide, 3,3,5-trimethylcyclomethyl ethyl ketone peroxide, 3,3,5-trimethylcyclohexanone peroxide, methylcyclohexanone peroxide, methyl acetoacetate peroxide, acetylacetone peroxide, etc.;

(2) Hydroperoxides: tert-butyl hydroperoxide, cumene hydroperoxide, diisopropylbenzene hydroperoxide, 2,5-dimethylhexane-2,5-dihydroperoxide, 1,1,3,3-tetramethylbutyl hydroperoxide, 2-(4-methylcyclohexyl) propane hydroperoxide, etc.;

(3) Dialkyl peroxides: di-tert-butyl peroxide, tert-butyl cumyl peroxide, dicymyl peroxide, $\alpha,\alpha'$-bis(tert-butylperoxy)-p-diisopropylbenzene, $\alpha,\alpha'$-bis(tert-butylperoxy)-p-isopropylhexyne, 2,5-dimethyl-2,5-di(tert-butylperoxy)hexane, 2,5-dimethyl-2,5-di(tert-butylperoxy)hexyne-3, etc.;

(4) Peroxy esters: tert-butyl peroxyacetate, tert-butyl peroxylaurate, tert-butyl peroxybenzoate, di-tert-butyl peroxyisophthalate, 2,5-dimethyl-2,5-di(benzoylperoxy hexane, tert-butylperoxy isopropyl carbonate, tert-butyl peroxyisobutyrate, tert-butyl peroxypivalate, tert-butyl peroxyneodecanoate, cumyl peroxyneodecanoate, tert-butyl peroxy-2-ethylhexanoate, tert-butyl peroxy-3,5,5-trimethylhexanoate, tert-butyl peroxymaleate, cumyl peroxyoctoate, tert-hexyl peroxypivalate, tert-hexyl peroxyneohexanoate, cumyl peroxyneohexanoate, etc.;

(5) Peroxy ketals: n-butyl 4,4-bis (tert-butylperoxy)valerate, 2,2-bis(tert-butylperoxy)butane, 1,1-bis(tert-butylperoxy)-3,3,5-trimethylcyclohexane, 1,1-bis(tert-butylperoxy)cyclohexane, 2,2-bis(tert-butylperoxy) butane, etc.;

(6) Diacyl peroxides: acetyl peroxide, isobutyryl peroxide, octanoyl peroxide, decanoyl peroxide, lauroyl peroxide, 3,3,5-trimethylcyclohexanoyl peroxide, succinic acid peroxide, benzoyl peroxide, 2,4-dichlorobenzoyl peroxide, m-toluoyl peroxide, etc.;

(7) Peroxydicarbonates: diisopropyl peroxydicarbonate, di-2-ethylhexyl peroxydicarbonate, di-n-propyl peroxydicarbonate, bis(4-tert-butylcyclohexyl) peroxydicarbonate, dimyristyl peroxydicarbonate, di-methoxyisopropyl peroxydicarbonate, di(3-methyl-3-methoxybutyl) peroxydicarbonate, diallyl peroxydicarbonate, etc.;

(8) Other organic peroxides: acetyl cyclohexylsulfonyl peroxide, tert-butylperoxy allyl carbonate, etc.

In the above graft polymerization, a catalyst for organic peroxide decomposition or a reducing compound may be used in combination with the organic peroxide. In carrying out the graft polymerization by adding an ethylenically unsaturated monomer component to the polyether compound, the polymerization initiator may be added in advance to the polyether compound or may also be added to the ethylenically unsaturated monomer component or may be added to the reaction system simultaneously with the ethylenically unsaturated monomer component.

The addition amount of the above polymerization initiator is not particularly restricted but, for example, the initiator is preferably used in an amount of 0.1 to 15% by weight on the ethylenically unsaturated monomer component basis. When it is less than 0.1% by weight or above 15% by weight, the ratio of grafting onto the polyether compound may possibly decrease. An addition amount of 0.5 to 10% by weight is more preferred.

The above graft polymerization can be carried out by any knownmethod of polymerization, such as solution polymerization or bulk polymerization. The solvent which can be used in carrying out solution polymerization is not particularly restricted but, for example, a solvent which will not adversely affect the efficiency of polymerization. As such a solvent, there may be mentioned, among others, water; hydrocarbons such as n-butane, propane, benzene, cyclohexane and naphthalane; halogenated hydrocarbons such as methyl chloride, chloroform, carbon tetrachloride and trichloroethane; alcohols such as propanol, butanol, isopropyl alcohol, isobutyl alcohol and isoamyl alcohol; ethers such as ethyl ether, isopropyl ether and butyl ether; ketones such as methyl ethyl ketone, ethyl butyl ketone and methyl isobutyl ketone; esters such as methyl acetate, ethyl acetate, ethyl benzoate and ethyl lactate; acids such as formic acid, acetic acid and propionic acid; polyhydric alcohol and derivatives thereof such as (poly) ethylene glycol, ethylene glycol monobutyl ether, ethylene glycol monobutyl ether acetate, tetraethylene glycol and propylene glycol monobutyl ether. These may be used singly or two or more of them may be used combinedly.

The above graft polymerization may be carried out either batchwise or continuously. The graft polymerization temperature is preferably 80 to 160° C. When it is lower than 80° C., the graft polymerization hardly proceeds and the efficiency of grafting of the ethylenically unsaturated monomer onto the polyether compound may decrease. When it is higher than 160° C., the starting material polyether compound and the graft polymer obtained may undergo thermal decomposition. A temperature of 100 to 160° C. is more preferred.

In the above graft polymerization, part or the whole of the polyether compound is preferably charged at the early stage. Further, when the ethylenically unsaturated monomer component comprises an α, β-unsaturated dicarboxylic acid monomer, namely at least one monomer selected from the group consisting of maleic acid, fumaric acid and maleic anhydride or the like, and a (meth)acrylic acid, the graft polymerization is preferably carried out by mixing in advance at least the half of the α, β-unsaturated dicarboxylic acid monomer with the polyether compound, heating the mixture to a temperature above the pour point of the polyether compound and adding the remaining ethylenically unsaturated monomer and the polymerization initiator individually to the mixture obtained. In this way, the proportion of introduction of the α, β-unsaturated dicarboxylic acid monomer into the graft polymer can be markedly improved.

The amount of the ethylenically unsaturated monomer component is not particularly restricted but, for example, it is preferred that the ethylenically unsaturated carboxylic acid monomer contained in the ethylenically unsaturated monomer component amount to 0.1 to 100 parts by weight per 100 parts by weight of the polyether compound. When the amount of the ethylenically unsaturated carboxylic acid monomer is less than 0.1% by weight, the resulting polymer will hardly act on cement, possibly resulting in a decrease in shrinkage reducing ability. When it is in excess of 100 parts by weight, the retardation of curing by the polymer may be enhanced or the reaction mixture will acquire an excessively high viscosity and thus become difficult to handle. A more preferred amount is 1 to 80 parts by weight, still more preferably 2 to 65 parts by weight.

The polymer obtained by the above graft polymerization may be used either as it is or in the form of a solution in a solvent as a shrinkage reducing agent for hydraulic materials. The solvent may be, for example, water, an alcohol or the like. The use of water is preferred, however. When the polymer has an acid group such as a carboxyl group and a sulfonic acid group or an ester group derived therefrom, the polymer may be used as an additive after conversion of part or the whole of the acid group or ester group to a salt form by addition of a base.

The base is not particularly restricted but includes, among others, alkali metal or alkaline earth metal hydroxides such as sodium hydroxide, potassium hydroxide, calcium hydroxide and lithium hydroxide; alkali metal or alkaline earth metal carbonates such as sodium carbonate, calcium carbonate and lithium carbonate; ammonia, monoethanolamine, diethanolamine, triethanolamine and like amines. These maybe used singly or two or more of them may be used combinedly.

The method of graft polymerization is not restricted to the one mentioned above but the methods described, for example, in JP 2945822, JP 2918798, JP 2918799 and Japanese Kokai Publication Hei-11-279220 may also be used.

The shrinkage reducing agent for hydraulic materials according to the invention is effective in reducing the shrinkage of hydraulic materials in the process of drying and is used mainly for the purposes of reducing cracks or preventing cracking, improving the filling capacity, preventing warpage and preventing peeling, among others.

In the following, the characteristics of the shrinkage reducing agent for hydraulic materials according to the invention are described.

In the shrinkage reducing agent for hydraulic materials according to the invention, the polymer mentioned above has a carboxyl group(s) and/or a group(s) derived therefrom by substitution of a cation such as a metal ion or ammonium ion for the hydrogen atom of the carboxyl group. Among such groups, there are included those generated by ester hydrolysis, for instance, on the occasion of addition of the agent into kneading water. Since it has such groups, the polymer takes the form of a carboxylic acid and/or a salt thereof.

The above-mentioned carboxylic acid and/or salt thereof can be identified by an analytical method known in the art. As such analytical method, there may be mentioned infrared spectroscopy (IR), nuclear magnetic resonance spectroscopy (NMR) and neutralization titration, among others. The carboxylic acid and/or salt thereof can be qualitatively and quantitatively analyzed by using these techniques combinedly. In IR, when a carboxylic acid and/or a salt thereof is present, an absorption band due to stretching of C=O of the carboxylic acid appears in the vicinity of 1700 to 1800 $cm^{-1}$. Neutralization titration gives an acid number, which is a positive number. The acid number is defined as the number of milligrams of potassium hydroxide required for neutralizing the carboxylic acid and/or a salt thereof in 1 g of the sample. In the practice of the invention, the acid number is preferably set at 1 to 1,000 mg/g, more preferably 10 to 500 mg/g, still more preferably30 to 300 mg/g. When the carboxylic acid partly or wholly occurs as a salt, the total carboxylic acid amount can be determined by once converting the salt to a totally acid form or totally alkali salt form and then performing neutralization titration. In cases where a carboxylic acid and/or a salt thereof is formed by ester hydrolysis or the like on the occasion of addition into kneading water, the analysis can be realized by hydrolyzing the sample beforehand and then assaying the same.

For the shrinkage reducing agent for hydraulic materials according to the invention, it is also preferred that the addition amount of the shrinkage reducing agent for hydraulic materials which is required for the mortar flow value in mortar flow testing to amount to not less than 110 mm and for the amount of air entrained to amount to not less than 11±2% by volume is not less than 1.0% by weight relative to cement on the solid matter basis or that even when the shrinkage reducing agent for hydraulic materials is added in an amount of 1.0% by weight or more relative to cement on the solid matter basis, neither the mortar flow value in mortar flow testing is 110 mm or more nor the amount of air entrained is 11±2% by volume or more.

The mortar flow value in mortar testing is determined by the following evaluation method.

[Evaluation Method]

Ordinary portland cement (400 g) and 800 g of standard Toyoura sand are dry-mixed in a Hobart type mortar mixer (model N-50 (trademark), product of Hobart) at a low speed for 30 seconds and, then, 240 g of water containing the above cement additive is added, followed by 3 minutes of kneading at an intermediate speed to give a mortar sample. The mortar obtained is immediately filled into a hollow cylinder with an inside diameter of 53.5 mm and a height of 50 mm as placed on a horizontal table to the top level of the cylinder, this cylinder is gently lifted up, and the major axis and minor axis of the mortar spread over the table are measured with vernier calipers. The mean value thereof is reported as the mortar flow value. For evaluating a cement composition entraining a smaller amount of air, the amount of air entrained in mortar is adjusted to 11±2% by volume using an air entraining agent (AE agent). The amount of air is calculated based on the mortar volume and weight and the ratio of the materials used.

Further, the shrinkage reducing agent for hydraulic materials according to the invention preferably satisfies both the following requirements: (a) that the addition amount required for attaining a certain shrinkage reducing effect should be not more than 60 percent of the addition amount required when the starting material polyether is used as the shrinkage reducing agent and (b) that the addition amount required for reducing the unit water content by 18% as compared with the unit water content in plain mortar or plain concrete should be not less than 0.5% by weight (relative to cement).

Referring to the above requirement (a), the shrinkage reducing ability is preferably evaluated after 28 days of curing according to JIS A 1129, for instance. The number of teats is preferably at least three and the mean value is preferably used for comparison. It is preferred that some shrinkage reducing agent is evaluated simultaneously as a standards sample. Useful as such a standard sample are, for example, the commercial products Nisso Maruzen Chemical's "GE-42-2P" (trademark) (diethylene glycol-dipropylene glycol monobutyl ether), Mitsubishi Gas Chemical's neopentyl glycol, Taiheiyo Cement's "Tetraguard AS21" (trademark), Fujisawa Pharmaceutical's "Hibiguard" (trademark) and Takemoto Yushi's "Hibidan" (trademark), among others. The degree of shrinkage of mortar or concrete varies depending on the cement species used, extent of weathering, aggregate species, mix proportions, kneading conditions, curing conditions and other factors. Therefore, evaluation should be made under the same test conditions and it is thus necessary to conduct tents on the same day(s) using the same materials and effecting curing under the same conditions.

The requirement (a) means that the shrinkage reducing agent for hydraulic materials should be prepared in an appropriate manner so that when the shrinkage reducing agent for hydraulic materials is used in an amount of not more than 1.2% by weight relative to cement on the solid matter basis, a shrinkage reducing effect can be obtained which is equivalent to the effect obtained by using the polyether, which is used in producing the polymer mentioned above, as a shrinkage reducing agent in an amount of 2% by weight relative to cement on the solid matter basis.

It is said that the commercially available polyether compounds known in the art as shrinkage reducing agents need to be used in an amount of about 2% by weight of the unit cement content. When the shrinkage reducing agent for hydraulic materials which meets the above requirement (a) according to the invention is used, a sufficient shrinkage reducing effect can be produced at a lower addition amount as compared with the so-far known shrinkage reducing agents and therefore the cost of production of hydraulic materials such as cement compositions, which are used almost everyday in large amounts, can be reduced. More preferably, the weight ratio of the shrinkage reducing agent for hydraulic materials to cement on the solid matter basis should be not more than 1.0% by weight, still more preferably not more than 0.8% by weight.

Referring to the above requirement (a), it is also preferred that the shrinkage reducing agent for hydraulic materials be prepared in an appropriate manner so that when the shrinkage reducing agent for hydraulic materials is used in an amount of not more than 1.2% by weight relative to cement on the solid matter basis, a shrinkage reducing effect can be obtained which is equivalent to the effect obtained by using diethylene glycol-dipropylene glycol monobutyl ether in an amount of 2% by weight relative to cement. More preferably, the weight ratio of the shrinkage reducing agent for hydraulic materials to cement on the solid matter basis should be not more than 1.0% by weight, still more preferably not more than 0.8% by weight.

Referring to the above requirement (b), plain concrete is preferably prepared according to JIS A 6204, for instance and plain mortar is preferably prepared according to mix proportions by which the addition amount in plain concrete can be reproduced. For establishing reproducibility, the use of an air entraining (AE) and high-range water reducing agent (to be mentioned later herein) as a standard sample is preferred. Thus, if when the addition amount of the air entraining and high-range water reducing agent required to reduce the water content per unit volume of plain concrete by 18% by weight is applied to plain mortar with the unit water content being reduced by 18% by weight, the plain concrete and plain mortar are equivalent in flowability, then the mortar test can be used as a simplified method of evaluation. On that occasion, the evaluation is preferably made at the same air content amount attained by appropriately using an antifoaming agent and/or an AE agent, since the difference in the amount of air entrained results in the difference in apparent flowability.

Referring to the above (b), it is more preferred to reduced the weight ratio of the shrinkage reducing agent for hydraulic materials to cement on the solid matter basis to not less than 1.0% by weight, still more preferably not less than 2.0% by weight.

The above-mentioned shrinkage reducing agent for hydraulic materials according to the invention may be made into an additive composition for hydraulic materials by incorporating therein such ingredients as mentioned later herein. The composition can produce various effects on hydraulic materials while producing the effects of the invention. The concentration of the shrinkage reducing agent for hydraulic materials in the additive composition for hydraulic materials is not particularly restricted.

The present invention is further related to an additive composition for hydraulic materials comprising a shrinkage reducing agent for hydraulic materials and a cement dispersing agent, in which additive composition the shrinkage reducing agent for hydraulic materials comprises at least one polymer selected from the group consisting of (A) a polymer having a structure derived from the residue of a compound containing 1 to 30 carbon atoms and one active hydrogen atom by the binding thereto of one oxyalkylene chain having a carboxyl-containing side chain, (B) a polymer having a structure derived from the residue of a compound containing 1 to 30 carbon atoms and two active hydrogen atoms by the binding thereto of at least one oxyalkylene chain having a carboxyl-containing side chain, (C) a polymer having a structure derived from the residue of a compound containing 1 to 30 carbon atoms and at least three active hydrogen atoms by the binding thereto of at least one oxyalkylene chain having a carboxyl-containing side chain and (D) a polymer having a structure derived from the residue of an amine by the binding thereto of one oxyalkylene chain having a carboxyl-containing side chain. Such additive composition for hydraulic materials can provide hydraulic materials with good properties contributing to the reduction of drying shrinkage and, at the same time, makes it possible for good dispersibility to be retained even when the amount of water to be added to hydraulic materials is reduced, hence the composition makes it possible to reduce the water content in hydraulic materials to thereby improve the strength and durability of cured products.

The additive composition for hydraulic materials according to the invention may contain another or other ingredients other than the above shrinkage reducing agent for hydraulic materials and a cement dispersing agent. Preferably, however, the composition contains the shrinkage reducing agent for hydraulic materials and the cement dispersing agent.

In the above shrinkage reducing agent for hydraulic materials, the polymer (A) and polymer (B) are the same as the polymer (a) and polymer (b) mentioned hereinabove except that they differ in the range of the number of carbon atoms to be contained in the residue derived from an active hydrogen-containing compound. The polymer (C) and polymer (D) are the same as the polymer (c) and polymer (d) mentioned hereinabove.

The cement dispersing agent is not particularly restricted so long as it is capable of dispersing cement particles. For example, there may be mentioned known cement dispersing agents and water reducing agents as well as ligninsulfonic acid, and polycarboxylic acid type, naphthalene type, melamine type and aminosulfonic acid type water reducing agents. These may be used singly or two or more of them may be used combinedly. The ability of the cement additive to disperse particles in hydraulic materials is improved by incorporating such a cement dispersing agent, the hydraulic materials become excellent in flowability, whereby the workability is markedly improved, and the strength, durability and other characteristics are improved as a result of reduction in water content in the hydraulic materials.

Among the water reducing agents mentioned above, ligninsulfonic acid and the like are generally referred to also as air entraining and water reducing agents while the polycarboxylic acid type, naphthalene type, melamine type, aminosulfonic acid type and like water reducing agents are generally referred to also as air entraining and high-range water reducing agents. Among such water reducing agents, air entraining and high-range water reducing agents are preferably used and polycarboxylic acid type air entraining and high-range water reducing agents can be used with advantage.

The proportions of the above shrinkage reducing agent for hydraulic materials and the cement dispersing agent are not particularly restricted. When an air entraining and high-range water reducing agent is used as the cement dispersing agent, the ratio (shrinkage reducing agent for hydraulic materials/air entraining and high-range water reducing agent) is preferably 1/10 to 100/1 by weight on the solid matter basis. The addition amount of the shrinkage reducing agent for hydraulic materials is larger than the above weight ratio, the water reducing ability of the air entraining and high-range of water reducing agent may be impaired. More preferred is a ratio between 1/100 to 50/1, still more preferably 1/100 to 25/1.

The mode of addition of the additive composition for hydraulic materials according to the invention to hydraulic materials is not particularly restricted. For example, the shrinkage reducing agent for hydraulic materials and the cement dispersing agent may be mixed up beforehand, followed by addition of the mixture to hydraulic materials, or the shrinkage reducing agent for hydraulic materials and the cement dispersing agent may be prepared separately and respectively added to hydraulic materials. The same can be said about any other combination mentioned herein.

The additive composition for hydraulic materials may further contain, when necessary, such a solvent as mentioned above and/or one or more other ingredients so long as the composition can produce the effects of the invention. For example, those known additives known in the art, such as those shown below under (1) to (20), can be used in combination.

(1) Water soluble macromolecular substances: unsaturated carboxylic acid polymers such as polyacrylic acid (sodium salt), polymethacrylic acid (sodium salt), polymaleic acid (sodium salt), acrylic acid-naleic acid copolymers (sodium salts); polyoxyethylene or polyoxypropylene polymers or copolymers such as polyethylene glycol and polypropylene glycol; nonionic cellulose ethers such as methylcellulose, ethylcellulose, hydroxymethylcellulose, hydroxyethylcellulose, carboxymethylcellulose, carboxyethylcellulose and hydroxypropylcellulose; polysaccharides producible by microbial fermentation such as yeast glucan, xanthan gum and β-1,3-glucans (which may be straight-chained or branched; e.g. cardlan, paramylon, pachyman, scleroglucan, laminaran); polyacrylamide; polyvinyl alcohol; starch; starch phosphate ester; sodium alginate; gelatin; amino-containing acylic acid copolymers and quaternized derivatives thereof; etc.;

(2) Macromolecule emulsions: copolymers of various vinyl monomers such as alkyl (meth)acrylates, etc.;

(3) Retarders: hydroxy carboxylic acids and salts thereof such as gluconic acid, glucoheptonic acid, arabonic acid, malic acid and citric acid as well as such inorganic or organic salts thereof as sodium, potassium, calcium, magnesium, ammonium and triethanolamine salts; saccharides, for example monosaccharides and oligosaccharides (disaccharides, trisaccharides, etc.) such as glucose, fructose, galactose, saccharose, xylose, apiose, ribose, and invert sugar, oligosaccharides such as dextrin, polysaccharides such as dextran, and molasses comprising them; sugar alcohols such as sorbitol; magnesium silicofluoride; phosphoric acid and salts thereof or boric acid esters; amino-carboxylic acids and salts thereof; alkali-soluble proteins; humic acid; tannic acid; phenols; polyhydric alcohols such as glyecrol; phosphonic acid and derivatives thereof such as aminotri (methylenephosphonic acid), 1-hydroxyethylidene-1,1-diphosphonic acid, ethylenediaminetetra (methylenephosphonic acid), diethylenetriaminepenta (methylenephosphonic acid) and alkali metal salts and alkaline earth metal salts thereof; etc.;

(4) High-early-strength agents or accelerators: soluble calcium salts such as calcium chloride, calcium nitrite, calcium nitrate, calcium bromide and calcium iodide; chlorides such as iron chloride and magnesium chloride, sulfuric acid salts; potassium hydroxide; sodium hydroxide; carbonic acid salts; thiosulfuric acid salts; formic acid and formic acid salts such as calcium formate; alkanolamines; alumina cement; calcium aluminate silicate; etc.;

(5) Mineral oil base antifoaming agents: kerosene, liquid paraffin, etc.;

(6) Fat/oil base antifoaming agents: animal and vegetable oils, sesame oil, castor oil, alkylene oxide-adducts thereof, etc.;

(7) Fatty acid base antifoaming agents: oleic acid, stearic acid, alkylone oxide-adducts thereof, etc.;

(8) Fatty acid ester base antifoaming agents: glycerol monolicinoleate, alkenylsuccinic acid derivatives, sorbitol monolaurate, sorbitol trioleate, natural wax, etc.;

(9) Oxyalkylene base antifoaming agents: polyokyalkylenes such as (poly)oxyethylene-(poly)oxypropylene adducts; (poly)oxyalkyl ethers such as diethylene glycol heptyl ether, polyoxyethylene oleyl ether, polyoxypropylene butyl ether, polyoxyethylene-polyoxypropylene 2-ethylhexyl ether and oxyethylene-oxypropylene adducts of $C_{12-14}$ higher alcohols; (poly)oxyalkylene (alkyl)aryl ethers such as polyoxypropylene phenyl ether and polyoxyethylene nonylphenyl ether; acetylene ethers such as alkylene oxide adducts derived from 2,4,7,9-tetramethyl-5-decyne-4,7-diol, 2,5-dimethyl-3-hexyne-2,5-diol, 3-methyl-1-butyn-3-ol and like acetylene alcohols; (poly) oxyalkylene fatty acid esters such as diethylene glycol oleate, diethylene glycol laurate and ethylene glycol distearate; (poly)oxyalkylenesorbitan fatty acid esters such as polyoxyethylene sorbitan monolaurate and polyoxyethylene sorbitan trioleate; (poly)oxyalkylene alkyl (aryl) ether sulfate ester salts such as polyoxypropylene methyl ether sulfate sodium salt and polyoxyethylene decylphenol ether sulfate sodium salt; (poly)oxyalkylene alkyl phosphorate esters such as (poly)oxyethylene stearyl phosphate ester; (poly)oxyalkylenealkylamines such as polyoxyethylenelaurylamine; polyoxyalkyleneamides; etc.;

(10) Alcohol base antifoaming agents: octyl alcohol, hexadecyl alcohol, acetylene alcohol, glycols, etc.;

(11) Amide base antifoaming agents: acrylate polyamines etc.;

(12) Phosphate ester base antifoaming agents: tributyl phosphate, sodium octylphosphate, etc.;

(13) Metal soap base antifoaming agents: aluminum stearate, calcium oleate, etc.;

(14) Silicone base antifoaming agents: dimethylsilicone oils, silicone pastes, silicone emulsions, organic group-modified polysiloxanes (polyorganosiloxanes such as dimethylpolysiloxane), fluorosilicone oils, etc.;

(15) AE (air entraining) agents: resin soaps, saturated or unsaturated fatty acids, sodium hydroxystearate, lauryl sulfates, ABS (alkylbenzenesulfonic acids or salts thereof), LAS (linear alkylbenzenesulfonic acids), alkanesulfonates, polyoxyethylene alkyl(phenyl) ethers, polyoxyethylene alkyl(phenyl) ether sulfate esters or salts thereof, polyoxythylene alkyl(phenyl) ether phosphate esters or salts thereof, proteinaceous materials, alkenylsulfosuccinic acids, α-olefinsulfonates, etc.;

(16) Other surfactants: polyalkylene oxide derivatives produced by addition of at least 10 moles of at least one alkylene oxide, such as ethylene oxide and propylene oxide, to a $C_{6-30}$ aliphatic monohydric alcohol such as octadecyl alcohol and stearyl alcohol, a $C_{6-30}$ alicyclic monohydric alcohol such as abietyl alcohol, a $C_{6-30}$ monohydric mercaptan such as dodecyl mercaptan, $C_{6-30}$ alkylphenol such as nonylphenol, a $C_{6-30}$ amine such as dodecylamine, or a $C_{6-30}$ carboxylic acid such as lauric acid and stearic acid; alkylated diphenyl ether sulfonic acid salts which is constituted of two phenyl groups having a sulfo group as bound together by ether bonding and may have an alkyl or alkoxy group as a substituent; various anionic surfactants; various cationic surfactants such as alkylamine acetates and alkyltrimethylammonium chlorides; various nonionic surfactants; various amphoteric surfactants; etc.;

(17) Waterproof agents: fatty acids (salts), fatty acid esters, fats and oils, silicones, paraffins, asphalt, waxes, etc.;

(18) Rust inhibitors: nitrites, phosphates, zinc oxide, etc.;

(19) Crack-reducing agents: polyoxyalkyl ethers; alkanediols such as 2-methyl-2,4-pentanediol, etc.;

(20) Expansive additives: ettringite-based ones, coal-based ones, etc.

As other known cement additives, there may be mentioned cement wetting agents, thickeners, separation reducing agents, flocculants, known agents for reducing drying shrinkage, strength increasing agents, self-leveling agents, rust inhibitors, colorants, fungicides, blast furnace slag, fly ash, cinder ash, clinker ash, husk ash, silica fume, silica powders, gypsum and the like. These known cement additives may be used singly or two or more of them may be used combinedly.

The additive composition for hydraulic materials according to the invention can be widely applied in so-far known concrete works, for instance. Such works are not particularly restricted but include, among others, high strength concrete works, very high strength concrete works, high flowing concrete works and flowing concrete works. The mode of use is not particularly restricted. For example, the composition may be used as it is in the form of a solid or powder, for instance, or in the form of aqueous solution or aqueous dispersion mixing with water.

The hydraulic materials in which the shrinkage reducing agent for hydraulic materials or the additive composition for hydraulic materials according to the invention is to be used are not particularly restricted so long as they have hydraulicity or latent hydraulicity. For example, mention may be made of portland cement species such as ordinary portland cement and high-early-strength portland cement, silica cement, fly ash cement, portland blast-furnace slag cement, alumina cement, belite-rich cement, various blended cement species; cement constituents such as tricalcium silicate, dicalcium silicate, tricalcium aluminate and tetracalcium aluminoferrite; and fly ash having latent hydraulicity, among others. These may be used singly or two or more of them may be used combinedly. Among them, ordinary Portland cement is generally and commonly used and suited for use.

The shrinkage reducing agent for hydraulic materials or the additive composition for hydraulic materials of the present invention is used preferably in an amount of 0.0001 to 10% by weight relative to the hydraulic material on the solid matter basis, for instance. When the amount is less than 0.0001% by weight, the shrinkage reducing ability may possibly be slight. When it exceeds 10% by weight, hydraulic materials may possibly undergo curing retardation. The addition amount is more preferably 0.001 to 7% by weight, still more preferably 0.005 to 5% by weight, most preferably 0.01 to 3% by weight.

The shrinkage reducing agent for hydraulic materials or the additive composition for hydraulic materials of the present invention can advantageously be incorporated in cement compositions among hydraulic materials. Usable as such cement compositions are those conventional ones, without any particular restriction. Thus, there may be mentioned cement-water pastes (cement water slurries) comprising cement and water; mortar comprising cement, water and sand; and concrete comprising cement, water, sand and stone, among others.

The cement to be incorporated in the above cement compositions may be any of those known species, without any particular restriction. Thus, mention may be made, for example, of portland cement species such as ordinary portland cement and high-early-strength portland cement, silica cement, fly ash cement, portland blast-furnace slag cement, alumina cement, belite-rich cement and various blended cement species. These may be used singly or two or more of them may be used combinedly. Among them, portland cement is generally and commonly used and the above-mentioned cement additive can be applied thereto with advantage.

The addition amount of the cement additive in the above cement compositions is not particularly restricted. For example, the shrinkage reducing agent for hydraulic materials, which is an essential constituent of the cement additive, is preferably used in an amount of 0.0001 to 10% by weight relative to cement on the solid matter basis. When the amount is less than 0.0001% by weight, the shrinkage reducing ability is not sufficiently effected. When it exceeds 10% by weight, hydraulic materials may possibly undergo curing retardation. The addition amount is more preferably 0.001 to 7% by weight, still more preferably 0.00 to 5% by weight, most preferably 0.01 to 3% by weight.

The proportion of water in the above cement compositions is not particularly restricted but preferably is 10 to 80% by weight relative to cement. When the amount of water is less than 10% by weight, the respective ingredients are mixed only to an insufficient extent, so that the compositions cannot be molded in some instances or the strengthmay decrease in other cases. When it is larger than 80% by weight, the strength of cured products obtained from the cement compositions may possibly decrease. The amount of water is more preferably 15 to 75% by weight, still more preferably 20 to 70% by weight, most preferably 25 to 65% by weight.

When the above cement compositions are used in the form of mortar or concrete, the sand and stone to be incorporated in the cement compositions may be any of those so far used in conventional cement compositions, without any particular restriction. Thus, mention may be made, for example, of natural fine aggregates such as river sand, sea sand and pit sand produced from rocks by the power of nature; artificial fine aggregates produced by crushing such rocks or slabs; lightweight fine aggregates; and the like. The addition amount of sand may be the same as in conventional cement compositions, without any particular restriction. The addition amount of stone, too, may be the same as in conventional cement compositions; there is no particular restriction. The fine aggregate (sand) ratio, for instance, is preferably 20 to 60% by weight. When it is less than 20% by weight, a rough concrete is obtained and, with concrete showing a large slump, the coarse aggregate and mortar fractions may tend to separate from each other. When it exceeds 60% by weight, higher unit cement content and unit water content are required, possibly giving concrete poor in flowability. The ratio is preferably 30 to 50% by weight.

Another or other materials may be incorporated in the above cement compositions, when necessary. The other materials are not particularly restricted but include the same ones as used in conventional cement compositions, for example silica fume, blast furnace slag, silica powders, and fibrous materials such as steel fibers and glass fibers. The addition amounts of these materials are not particularly restricted but may be the same as those in conventional cement compositions.

The method of preparing the cement compositions is not particularly restricted. Mention may be made, for instance, of the same method as in preparing conventional cement compositions which comprises, for example, adding the cement additive or an aqueous dispersion or solution thereof to a mixer on the occasion of blending cement and water together, if necessary together with another or other ingredients, and mixing up the whole; the method comprising mixing cement with water, if necessary together with another or other ingredients, beforehand and adding to the resulting mixture the cement additive or an aqueous dispersion or solution thereof and mixing up the whole; the method comprising mixing cement with another or other ingredients as necessary beforehand, adding to the mixture obtained the cement additive or an aqueous dispersion or solution thereof and water, and mixing up the whole; and the method comprising mixing cement with the cement additive or an aqueous dispersion or solution thereof, if necessary together with another or other ingredients, adding water to the resulting mixture and mixing up the whole.

The above cement compositions give cured products excellent in strength and durability, among others, and therefore can give improved safety to the structures made therefrom or can reduce the cost of repairing. Therefore, they can be used widely and advantageously in various fields, such as civil engineering and architectural structures. Such cement compositions, too, constitute a preferred mode of embodiment of the present invention, The shrinkage reducing agent for hydraulic materials according to the invention, which has the above constitution, when applied to hydraulic materials such cement paste, mortar, concrete and like cement compositions, can improve the strength and durability of cured products by sufficiently preventing the progress of shrinkage of the cured products upon drying and thereby producing a better cracking preventing effect while the addition amount to hydraulic materials can be suppressed and the cost of production of hydraulic materials can thus be reduced. Thus, it can improve the safety of civil engineering and architectural structures and suppress the cost of repairing thereof, hence is high in general versatility.

EXAMPLES

The following examples illustrate the present invention in further detail. They are, however, by no means limitative of the scope of the invention.

In the examples, "part(s)" and "%" mean "part(s) by weight" and "% by weight", respectively, unless otherwise specified.

(Method of Water Content Measurement)

The water content was determined using a Karl Fischer moisture meter. The apparatus used was Metler's Karl Fischer titrator DL18 (trademark). Hayashi Junyaku Kogyo's Hydranal composite 5K (trademark) was used as Karl Fischer's reagent.

(Hydroxyl Value Determination)

The hydroxyl value, which is the number of milligrams of potassium hydroxide corresponding to the amount of the hydroxyl group contained in 1 g of the sample, was determined in the following manner.

(1) A phthalating reagent is prepared by adding 200 g of pyridine to 35 g of phthalic anhydride and effecting dissolution of the latter.
(2) About 1 g of the sample is accurately weighed in a Teflon vessel and 10 ml of the phthalating reagent is added. Separately, 10 ml of the phthalating reagent alone is added to a Teflon vessel for use as a blank.
(3) The above vessel is placed on a hot plate heated at 120° C. and allowed to stand for about 1 hour with occasional stirring to thereby phthalate the hydroxyl group in the sample.
(4) After cooling, titration is carried out using 0.5 N aqueous potassium hydroxide and the hydroxyl value is calculated from the difference in acid number between the sample and blank. Hiranuma Sangyo's automatic titrator COMTITE-550 (trademark) was used for the titration.

(Solid Content Determination)

The solid content wag calculated by measuring the non-volatile matter in the sample. About 1 g of the sample was accurately weighed and then placed in a drier in a nitrogen atmosphere maintained at 130° C. for 1 hour and, after cooling, the sample was again accurately weighed, and the nonvolatile matter content was calculated.

(Molecular Weight and Molecular Weight Distribution Determination)

The molecular weight and molecular weight distribution were determined by GPC (gel permeation chromatography) under the following conditions:

Precolumn: KF800D (trademark, product of Shodex), one column;
Column: KF800L (trademark, product of Shodex), three columns connected in series;
Column temperature: 40° C. (adjusted by means of a column oven);
Mobile phase: Chloroform (for high performance liquid chromatography, product of Wako Pure Chemical Industries);
Flow rate: 1.0 ml/min;
Test sample: The sample was diluted with the mobile phase to 0.5% on the solid matter basis and the dilution was filtered through a 0.45-micron filter, ChromatoDisk 13 N (trademark, product of GL Science);
Injection size: 100 μl;
Detector: RI Shodex SE-61 differential refractive index detector (trademark, product of Shodex);
Standard samples for working curve construction: Standard polyethylene glycol samples,
Mp=960, 1470, 4250 and 12600 (trademarks, product of GL Science),
Mp=21000, 45000, 85000, 160000 (trademarks, product of Tosoh).

(Outline of Working Curve Construction)

A cubic curve is constructed by plotting the peak top times (abscissa) of the above samples against the molecular weights (ordinate) thereof. The peak top molecular weights (Mp) were used as the molecular weights.

(Molecular Weight Calculation)

The data for the test sample are computed by Nippon Bunko data processing system for chromatography BORWIN (trademark), and the molecular weight is determined. The calibration curve approximating equation for the molecular weight was:

$$\log M = A + BRt + CRt^2 + DRt^3$$

where M=molecular weight, Rt=retention time (tin) A=24.11, B=−2.072, C=0.0759, D=−0.00103.

(Total Acid Number Determination)

The total acid number, which is the number of milligrams of potassium hydroxide equivalent to the total amount of carboxylic acids contained in 1 g of the sample, was determined in the following manner:
(1) About 1 g of the sample is accurately weighed in a beaker and 50 g of water (or acetonitrile) and a magnetic stirrer are placed therein.
(2) 0.1 N aqueous hydrochloric acid (reagent for titration) is added until a pH of not higher than 2.0 is obtained.
(3) 0.1 N aqueous sodium hydroxide (reagent for titration) is added dropwise, and the amount of acid is determined from the difference between the first and second inflection points. Hiranuma Sangyo's automatic titrator COMTITE-550 (trademark) was used.

First, additives were prepared in the following manner.

Production Example 1

A glass reactor equipped with a thermometer, a stirrer, a nitrogen inlet tube and a reflux condenser was charged with 120.0 parts of Softanol 30 (trademark, product of Nippon Shokubai; $C_{12-14}$ secondary alcohol-ethylene oxide (EO) (3 moles on average) adducts, molecular weight 332, molecular weight distribution (Mw/Mn)=1.36) and 15.5 parts of maleic acid, and the charge was heated to 125±5° C. in a nitrogen atmosphere for melting and mixing up. Then, while maintaining the temperature at 125±5° C., 14.5 parts of acrylic acid and 3.3 parts of tert-butylperoxy isopropyl carbonate (trademark Perbutyl I, product of Nippon Oil and Fat) were separately added dropwise continuously over 1 hour. Thereafter, stirring was continued at 125±5° C. for 1 hour, to give a graft polymer (graft polymer 1).

The graft polymer 1 had a weight average molecular weight (Mw) of 11,700 and a molecular weight distribution (Mw/Mn) of 16.8. The graft polymer 1 also had a total acid number of 71.9 mg/g.

Water (275.2 parts) and 7.6 parts of an aqueous solution of sodium hydroxide (30% solution) were added to 30.6 parts of the graft polymer 1 to give an aqueous solution of the sodium salt of graft polymer 1. This additive is referred to as "additive 1".

The additive 1 obtained had a pH of 8.3 and a solid content of 9.1% and occurred as a pale yellow turbid solution. Upon standing at room temperature, a white insoluble matter separated and rose to the surface. Therefore, prior to use, this additive was shaken thoroughly until it became homogeneous.

Production Example 2

A stainless steel pressure reactor equipped with a thermometer, a stirrer, a nitrogen inlet tube and a pressure gage was charged with 601.0 parts of isopropyl alcohol (product of Wako Pure Chemical Industries; moisture content 0.04%) and 0.4 part of sodium hydroxide. The pressure reactor inside was purged with nitrogen with stirring, and the pressure reactor inside was heated to 100±5° C. Then, 1,321.5 parts of ethylene oxide was introduced into the reactor at a temperature of 100 to 140° C. and a safety pressure of $2.0 \times 10^{-1}$ to $7.8 \times 10^{-1}$ MPa. After maturation, the volatile matter was removed to give an intermediate (intermediate a), namely an isopropyl alcohol-ethylene oxide adduct.

The molecular weight of intermediate a was determined based on its hydroxyl value and found to be 245.8. Thus, the average number of moles of ethylene oxide added to isopropyl alcohol was calculated at 4.2.

Then, a stainless steel pressure reactor equipped with a thermometer, a stirrer, a nitrogen inlet tube and a pressure gage was charged with 491.6 parts of intermediate a and 0.26 part of sodium hydroxide. The pressure reactor inside was purged with nitrogen with stirring, and the pressure reactor inside was heated to 120±10° C. Then, 402.8 parts of propylene oxide was introduced into the reactor at a temperature of 120±10° C. and a safety pressure of $2.9 \times 10^{-1}$ to $7.8 \times 10^{-1}$ MPa. After maturation, the volatile matter was removed to give an intermediate (intermediate b), namely an isopropyl alcohol-ethylene oxide-propylene oxide adduct.

The number of moles of propylene oxide added in intermediate b was calculated at 3.3 based on the material balance. Thus, the intermediate b was regarded as a product resulting from blockwise addition of 4.2 moles (on average) of ethylene oxide and 3.3 moles (on average) of propylene oxide to isopropyl alcohol (containing 3 carbon atoms).

A glass reactor equipped with a thermometer, a stirrer, a nitrogen inlet tube and a reflux condenser wag charged with 120.0 parts of the intermediate b and 15.6 parts of maleic acid, and the charge was heated to 125±5° C. in a nitrogen atmosphere for melting and mixing up. Then, while maintaining the temperature at 125±5° C., 14.4 parts of acrylic acid and 3.0 parts of tert-butylperoxy isopropyl carbonate (trademark Perbutyl I, product of Nippon Oil and Fat) were individually added dropwise continuously over 1 hour. Thereafter, stirring was continued at 125±5° C. for 1 hour, to give a graft polymer (graft polymer 2).

The graft polymer 2 had a weight average molecular weight (Mw) of 24,300 and a molecular weight distribution (Mw/Mn) of 30.7. The graft polymer 2 also had a total acid number of 118.7 mg/g.

Addition of 276.6 parts of water to 30.7 parts of the graft polymer 2 gave a semiturbid solution with a pH of 2.4. Thereto was added 9.4 parts of an aqueous solution of sodium hydroxide (30% solution) to give an aqueous solution of the sodium salt of graft polymer 2. This is referred to as "additive 2". The additive 2 obtained occurred as a pale yellow transparent solution with a pH of 7.7 and a solid content of 9.1% and did not separate for at least 1 month at room temperature.

Production Example 3

A commercial shrinkage reducing agent, Tetraguard AS21 (trademark, product of Taiheiyo Cement) comprising lower alcohol-derived alkylene oxide adducts had a water content of 14.6% as measured by a moisture meter. Therefore, it was dehydrated under reduced pressure and warming using an evaporator (50° C., not higher than $1.3 \times 10^{-2}$ MPa) and further dehydrated thoroughly in a vacuum drier (50° C., not higher than $6.7 \times 10^{-3}$ MPa) to give dehydrated Tetragurad AS21 (moisture content 0.4%). The dehydrated Tetragurad AS21 thus obtained had a hydroxyl value of 181.7 mg/g. Based on this result, the average molecular weight of Tetragurad AS21 was calculated at 309. The molecular weight distribution (Mw/Mn) of Tetragurad AS21 was measured and found to be 1.13.

A glass reactor equipped with a thermometer, a stirrer, a nitrogen inlet tube and a reflux condenser was charged with 80.0 parts of the dehydrated Tetragurad AS21 (trademark, product of Taiheiyo Cement) and 10.4 parts of maleic acid, and the charge as heated to 110° C. in a nitrogen atmosphere for melting and blending. Then, while maintaining the temperature at 100±10° C., 9.2 parts of acrylic acid and 2.0 parts of tert-butylperoxy isopropyl carbonate (Perbutyl I (trademark, product of Nippon Oil and Fat) were individually added dropwise continuously over 1 hour. Thereafter, stirring was continued at 120±5° C. for 1 hour to give a graft polymer (graft polymer 3)

The graft polymer 3 had a weight average molecular weight (Mw) of 6,300 and a molecular weight distribution (Mw/Mn) of 8.9.

Water (228.9 parts) and 16.7 parts of an aqueous solution of sodium hydroxide (48% solution) were added to 100 parts of the graft polymer 3 to give an aqueous solution of the sodium salt of graft polymer 3. This additive is referred to as "additive 3". The additive 3 obtained occurred as a pale yellow transparent solution with a pH of 6.8 and a solid content of 26.6% and did not separate for at least 6 months at room temperature (about 20° C.).

Comparative Example 1

No shrinkage reducing agent was added.

Comparative Examples 2 and 3

The dehydrated Tetraguard AS21 (trademark, product of Taiheiyo Cement) obtained in Production Example 3 was used for comparison (comparative additive 1).

Comparative Example 4

Diethylene glycol-dipropylene glycol monobutyl ether (GE-42-2P, (trademark), product of Nisso Maruzen Chemical) was used for comparison (comparative additive 2).

Comparative Examples 5 and 6

The same agent Softanol 30 (trademark, product of Nippon Shokubai) as used in Production Example 1 was used for comparison (comparative additive 3).

Comparative Examples 7 and 8

The intermediate b synthesized in Production Example 2 was used for comparison (comparative additive 4).

Using the additives prepared in the above manner, mortar mixes were kneaded, and test pieces prepared and evaluated for shrinkage reducing ability (cracking preventing ability) by measuring changes in length.

(Mortar Kneading)

Ordinary portland cement (400 g, product of Taiheiyo Cement) and 800 g of standard Toyoura sand were drymixed in a Hobart type mortar mixer (model N-50 (trademark), product of Hobart) for 30 seconds and, then, 260 g of an additive mixture prepared by diluting the additives specified in Table 1 or 2, each weighed as specified in Table 1 or 2, with water, followed by 3 minutes of kneading at an intermediate speed to give a mortar sample.

The mortar obtained was immediately filled into a stainless steel hollow cylinder with an inside diameter of 53.5 mm and a height of 50 mm as placed on a horizontal table to the top level of the cylinder, this cylinder was gently lifted up, and the major axis and minor axis of the mortar spread over the table were measured with vernier calipers. The mean value thereof was reported as the mortar flow value. When the amount of air entrained is large, flow and shrinkage values are apparently exaggerated and therefore the amount of air entrained should be constant. Thus, an appropriate amount of a defoaming agent (of oxyalkylene type) was used.

The amount of air was calculated based on the mortar volume and weight and the ratio of the materials used. The results obtained are shown in Table 1.

(Preparation of Test Pieces)

Test pieces (4×4×16 cm) were prepared according to JIS A 1129. Frameworks were coated with a silicone grease in advance so as to render them impermeable to water and facilitate release from the frameworks. A gage plug was mounted on each end of each test piece. The mortar obtained by kneading wag cast into each framework and preliminary curing was effected in a constant temperature, constant humidity chamber (PL-2G (trademark), product of Tabai Espeque) maintained at a temperature of 20° C. and a humidity of 60%. After 4 days, the test piece was released from the framework and the silicone grease adhering to the surface of the test piece was washed off with water using a sponge-made scrubbing brush. Then, the test piece was cured in still water at 20° C. for 7 days.

(Length Change Measurement)

A dial gauge (product of Nishinippon Shikenki) was used according to JIS A 1129. The surface water on the test piece cured in still water for 7 days was wiped off with a paper towel and, immediately, the length of the test piece was measured and this time point was taken as time zero. The test piece was then stored in a constant temperature, constant humidity chamber maintained at a temperature of 20° C. and a humidity of 60% and subjected to length measurement at timed intervals. The thus-obtained results of length change measurements are shown in Table 1.

TABLE 1

| | Additives used | Addition amount (weight %) | Flow value (mm) | Air content (vol. %) | Change in length ($\mu$m) | | | | | |
|---|---|---|---|---|---|---|---|---|---|---|
| | | | | | Day 0 | Day 2 | Day 4 | Day 7 | Day 14 | Day 23 | Day 28 |
| Ex. 1 | Additive 1 | 0.5 | 128 | 6.4 | 0 | −1 | 13 | 15 | 38 | 70 | 84 |
| | AE and high-range water reducing agent | 0.15 | | | | | | | | | |
| | Antifoam | 1 | | | | | | | | | |
| Ex. 2 | Additive 2 | 0.5 | 181 | 0 | 0 | 9 | 32 | 44 | 83 | 117 | 131 |
| | AE and high-range water reducing agent | 0.15 | | | | | | | | | |
| | Antifoam | 1 | | | | | | | | | |
| Ex. 3 | Additive 2 | 1 | 174 | 3.5 | 0 | 4 | 27 | 40 | 74 | 105 | 117 |
| | AE and high-range water reducing agent | 0.15 | | | | | | | | | |
| | Antifoam | 0.5 | | | | | | | | | |
| Compar. Ex. 1 | AE and high-range water reducing agent | 0.15 | 134 | 0.6 | 0 | 15 | 40 | 54 | 104 | 142 | 159 |
| | Antifoam | 0.2 | | | | | | | | | |
| Compar. Ex. 2 | Comparative additive 1 | 1 | 130 | 0 | 0 | 10 | 30 | 38 | 76 | 113 | 130 |
| | AE and high-range water reducing agent | 0.15 | | | | | | | | | |
| | Antifoam | 0.2 | | | | | | | | | |
| Compar. Ex. 3 | Comparative additive 1 | 2 | 148 | 0 | 0 | 9 | 26 | 32 | 68 | 103 | 122 |
| | AE and high-range water reducing agent | 0.15 | | | | | | | | | |
| | Antifoam | 0.2 | | | | | | | | | |
| Compar. Ex. 4 | Comparative additive 2 | 2 | 141 | 0 | 0 | 6 | 22 | 27 | 60 | 98 | 115 |
| | AE and high-range water reducing agent | 0.15 | | | | | | | | | |
| | Antifoam | 0.2 | | | | | | | | | |
| Compar. Ex. 5 | Comparative additive 3 | 1 | 138 | 0.9 | 0 | 4 | 20 | 28 | 64 | 100 | 117 |
| | AE and high-range water reducing agent | 0.15 | | | | | | | | | |
| | Antifoam | 0.2 | | | | | | | | | |
| Compar. Ex. 6 | Comparative additive 3 | 2 | 139 | 1.2 | 0 | 3 | 20 | 25 | 61 | 98 | 115 |
| | AE and high-range water reducing agent | 0.15 | | | | | | | | | |
| | Antifoam | 0.2 | | | | | | | | | |
| Compar. Ex. 7 | Comparative additive 4 | 1 | 138 | 0.2 | 0 | 12 | 33 | 43 | 85 | 123 | 141 |
| | AE and high-range water reducing agent | 0.15 | | | | | | | | | |
| | Antifoam | 0.2 | | | | | | | | | |
| Compar. Ex. 8 | Comparative additive 4 | 2 | 129 | 0.3 | 0 | 9 | 29 | 35 | 70 | 104 | 121 |
| | AE and high-range water reducing agent | 0.15 | | | | | | | | | |
| | Antifoam | 0.2 | | | | | | | | | |

*The addition amounts (except for antifoam) are based on the solid content of cement. The addition amount of the antifoam is based on the solid content of the air entraining and high range water reducing agent. The AE and high-range water reducing agent used was Aqualoc FC-900 (product of Nippon Shokubai).

(Test Results)

The properties of each fresh mortar sample obtained are shown in Table 1. For securing a certain extent of mortar flowability, a specified amount of an air entraining and high-range water reducing agent was used. The air entraining and high-range water reducing agent used was Aqualoc FC-900 (trademark, product of Nippon Shokubai, polycarboxylic acid type). As a result, a flowability of not less than 110 mm was secured in all the tests. Further, when the amount of air is large, the drying shrinkage increases and an apparently exaggerated change in length may be observed. For this reason, an appropriate amount of an antifoaming agent was added to thereby adjust the amount of air.

Table 1 shows the shrinkage length ($\mu$m) on each specified day from day 0 (the day when curing in water was finished). A smaller numerical value indicates a smaller shrinkage and suggests that the structure in question will be prevented from cracking due to shrinkage.

In the following, referring to the results obtained on day 28 as shown in Table 1 the contents of Table 1 are explained.

In Comparative Example 1, the test piece made without adding any additive for shrinkage reduction and initially having a length of 16 cm shrinked by 159 μm. In Comparative Example 2, the addition of 1% of a commercially available shrinkage reducing agent (Tetraguard AS21 (trademark), product of Taiheiyo Cement) suppressed the shrinkage to 130 μm and, in Comparative Example 3, the addition of 2% of the same agent suppressed the shrinkage to 122 μm. When compared with Comparative Example 1, the reduction in shrinkage was 29 μm at the addition amount of 1% and it was 37 μm at the addition amount of 2%. With the increase in addition amount, the shrinkage reducing effect thus increased.

and test pieces prepared and evaluated for shrinkage reducing ability (cracking preventing ability) by measuring changes in length. The results are shown in Table 2.

Comparative Example 9

No shrinkage reducing agent was added.

Comparative Example 10

The dehydrated Tetraguard AS21 (trademark, product of Taiheiyo Cement) obtained in Production Example 3 was used for comparison (comparative additive 1).

TABLE 2

| | Additives used | Addition amount (weight %) | Flow value (mm) | Air content (vol. %) | Change in length (μm) | | | | |
|---|---|---|---|---|---|---|---|---|---|
| | | | | | Day 0 | Day 2 | Day 7 | Day 18 | Day 28 |
| Ex. 4 | Comparative additive 3<br>AE and high-range water reducing agent<br>Antifoam | 1<br>0.15<br><br>0.1 | 149 | 2.3 | 0 | 28 | 76 | 189 | 213 |
| Compar. Ex. 9 | AE and high-range water reducing agent | 0.15 | 140 | 5.5 | 0 | 26 | 93 | 217 | 245 |
| Compar. Ex. 10 | Comparative additive 1<br>AE and high-range water reducing agent | 2.0<br>0.15 | 115 | 0.0 | 0 | 20 | 80 | 197 | 225 |

*The addition amounts (except for antifoam) are based on the solid content of cement. The addition amount of the antifoam is based on the solid content of the air entraining and high range water reducing agent. The AE and high-range water reducing agent used was Aqualoc FC-900 (product of Nippon Shokubai).

The same applied to Comparative Examples 7 and 8. When compared with Comparative Example 1, the reduction in shrinkage was 18 μm at the addition amount of 1% and it was 38 μm at the addition amount of 2%. It is seen that the shrinkage reducing effect increased with the increase in addition amount.

In Example 1, the additive 1 of the invention was used, which was synthesized using Softanol 30 (trademark, product of Nippon Shokubai), which was used in Comparative Examples 5 and 6, as a starting material. The shrinkage was reduced as compared with Comparative example 1 (no addition) and further, the results obtained indicate that at an addition amount of not more than half as compared with Comparative Examples 5 and 6 in which the starting material Softanol 30 was used, the shrinkage reducing effect exceeded those obtained by using that starting material as the shrinkage reducing agent.

In Example 2 and Example 3, the additive 2 of the invention was used, which was synthesized starting with the polyether (intermediate b) used in Comparative Examples 7 and 8. The shrinkage was reduced as compared with Comparative Example 1 (no addition). Further, while the reduction in shrinkage was 38 μm in Comparative Example 8 in which the starting material intermediate b was used at a level of 2% (on cement basis), the shrinkage was reduced by 42 μm in Example 3 in which the addition amount was 1% (on cement basis). Thus, it can be seen that the additives of the invention can produce, at half the addition amount, the same shrinkage reducing effect as those produced by the starting materials.

Example 4

Using the additives 3 obtained in Production Example 3 prepared in the above manner, mortar mixes were kneaded, In Example 4, the additive 3 of the invention was used, which was synthesized using the dehydrated Tetraguard AS21 (trademark, product of Taiheiyo Cement), which was used in Comparative Example 10, as a starting material. The shrinkage was reduced as compared with Comparative Example 9 (no addition) and further, the results obtained indicate that at an addition amount of not more than half as compared with Comparative Example 10 in which the starting material dehydrated Tetraguard AS21 (trademark, product of Taiheiyo Cement) was used, the shrinkage reducing effect exceeded those obtained by using that starting material as the shrinkage reducing agent.

Production Example 4

A glass reactor equipped with a thermometer, a stirrer, a nitrogen inlet tube and a reflux condenser was charged with 105.0 parts of Softanol 30 (trademark, product of Nippon Shokubai) and 23.3 parts of maleic acid, and the charge was heated to 125±5° C. in a nitrogen atmosphere for melting and mixing up. Then, while maintaining the temperature at 125±5° C., 21.7 parts of acrylic acid and 4.9 parts of tert-butylperoxy isopropyl carbonate (trademark Perbutyl I, product of Nippon Oil and Fat) were individually added dropwise continuously over 1 hour. Thereafter, stirring was continued at 125±5° C. for 1 hour, to give a graft polymer (graft polymer 4).

Water (71.4 parts) and 2.9 parts of an aqueous solution of sodium hydroxide (30% aqueous solution) were added to 6.6 parts of the qraft polymer 4 to give an aqueous solution of the sodium salt of graft polymer 4. This is referred to as "additive 4".

The additive 4 obtained had a pH of 7.0 and a solid content of 8.5% and occurred as a pale yellow turbid solution. Upon standing at room temperature, a white insoluble matter separated and rose to the surface. Therefore, prior to use, this additive was shaken thoroughly until it became homogeneous.

Production Example 5

A glass reactor equipped with a thermometer, a stirrer, a nitrogen inlet tube and a reflux condenser was charged with 120.0 parts of Softanol 70H (trademark, product of Nippon Shokubai; $C_{12-14}$ secondary alcohol-ethylene oxide (EO; 7 moles on avarage) adducts) and 15.5 parts of maleic acid, and the charge was heated to 125±5° C. in a nitrogen atmosphere for melting and mixing up. Then, while maintaining the temperature at 125±5° C., 14.5 parts of acrylic acid and 3.3 parts of tert-butylperoxy isopropyl carbonate (trademark Perbutyl I, product of Nippon Oil and Fat) were individually added dropwise continuously over 1 hour. Thereafter, stirring was continued at 125±5° C. for 1 hour, to give a graft polymer (graft polymer 5).

Water (108.1 parts) and 3.9 parts of an aqueous solution of sodium hydroxide (30% aqueous solution) were added to 12.7 parts of the graft polymer 5 to give an aqueous solution of the sodium salt of graft polymer 5. This is referred to as "additive 5".

The additive 5 obtained occurred as a pale yellow transparent solution having a pH of 7.0 and a solid content of 10.4%. It did not separate for at least 1 month at room temperature.

Example 5 and Example 6

Using the additives obtained in the above manner, mortar kneading was performed and test pieces were prepared by the methods mentioned above and the specimens were evaluated for shrinkage reducing ability (cracking preventing ability) by measuring the changes in length. The results are shown in Table 3.

Comparative Example 11

No shrinkage reducing agent was added.

Comparative Example 12

Softanol 30 (trademark, product of Nippon Shokubai) was used for comparison (comparative additive 3).

Comparative Example 13

Softanol 70H (trademark, product of Nippon Shokubai) was used for comparison (comparative additive 5).

Comparative Example 14

The dehydration product derived from Tetraguard AS21 (trademark, product of Taiheiyo Cement) as obtained in Production Example 3 was used for comparison (comparative additive 1).

The results obtained in Comparative Examples 11 to 14 are shown in Table 3.

TABLE 3

| Ex. No. | Additives used | Addition amount (weight %) | Mortar evaluation result Flow value (mm) | Air content (volume %) | Change in length [µm] Day 0 | Day 3 | Day 7 | Day 14 | Day 21 | Day 28 |
|---|---|---|---|---|---|---|---|---|---|---|
| Ex. 5 | FC-900 | 0.10 | 114.5 | 5.1 | 0.0 | 26.3 | 31.5 | 70.5 | 98.5 | 109.9 |
|  | Antiform | 0.50 |  |  |  |  |  |  |  |  |
|  | Additive 4 | 0.50 |  |  |  |  |  |  |  |  |
| Ex. 6 | FC-900 | 0.10 | 202.0 | 9.6 | 0.0 | 23.0 | 37.0 | 72.0 | 114.0 | 115.8 |
|  | Antiform | 0.50 |  |  |  |  |  |  |  |  |
|  | Additive 5 | 0.50 |  |  |  |  |  |  |  |  |
| Compar. Ex. 11 | FC-900 | 0.10 | 113.0 | 0.0 | 0.0 | 44.8 | 78.0 | 134.5 | 180.0 | 187.4 |
|  | Antiform | 0.50 |  |  |  |  |  |  |  |  |
| Compar. Ex. 12 | FC-900 | 0.10 | 117.5 | 0.7 | 0.0 | 25.3 | 34.5 | 81.0 | 112.5 | 120.8 |
|  | Antiform | 0.50 |  |  |  |  |  |  |  |  |
|  | Comparative Additive 3 | 2.00 |  |  |  |  |  |  |  |  |
| Compar. Ex. 13 | FC-900 | 0.10 | 118.0 | 61.0 | Could not evaluated due to excessively high air content. | | | | | |
|  | Antiform | 0.50 |  |  |  |  |  |  |  |  |
|  | Comparative Additive 5 | 2.00 |  |  |  |  |  |  |  |  |
| Compar. Ex. 14 | FC-900 | 0.10 | 115.0 | 0.0 | 0.0 | 25.4 | 35.5 | 81.0 | 112.5 | 123.4 |
|  | Antiform | 0.50 |  |  |  |  |  |  |  |  |
|  | Comparative Additive 1 | 2.00 |  |  |  |  |  |  |  |  |

In Example 5, the additive 4 of the invention was used, which was synthesized starting with Softanol 30 (trademark, product of Nippon Shokubai) used in Comparative Example 12 and, in Example 6, the additive 5 of the invention was used, which was synthesized starting with Softanol 70H (trademark, product of Nippon Shokubai) used in Comparative Example 13. In Examples 5 and 6, the shrinkage was reduced as compared with Comparative Example 11 (no addition) or Comparative Example 14 in which a commercial shrinkage reducing agent (comparative additive 1) was used and, further, the results obtained indicate that the additives 4 and 5, even when used at an addition amount of not more than half as compared with Comparative Examples 12 and 13 in which the starting materials Softanol 30 and Softanol 70H were used, respectively, show a higher shrinkage reducing effect than the effects obtained by using the starting materials as shrinkage reducing agents.

Production Example 6

A glass reactor equipped with a thermometer, a stirrer, a nitrogen inlet tube and a reflux condenser was charged with 320.0 parts of Softanol EP90150 (trademark, product of Nippon Shokubai; $C_{12-14}$ secondary alcohol-EO (9 moles)-propylene oxide (PO; 15 moles) adducts) and 41.3 parts of maleic acid, and the charge was heated to 125±5° C. in a nitrogen atmosphere for melting and mixing up. Then, while maintaining the temperature at 125±5° C., 38.7 parts of acrylic acid and 8.8 parts of tert-butylperoxy isopropyl carbonate (trademark Perbutyl I, product of Nippon Oil and Fat) were individually added dropwise continuously over 1 hour. Thereafter, stirring was continued at 125±5° C. for 1 hour, to give a graft polymer (graft polymer 6).

Water (90.3 parts) and 4.8 parts of an aqueous solution of sodium hydroxide (30% aqueous solution) were added to 16.0 parts of the graft polymer 6 to give an aqueous solution of the sodium salt of graft polymer 6. This is referred to as "additive 6".

The additive 6 obtained occurred as a pale yellow turbid solution having a pH of 7.4 and a solid content of 15.3%. Upon standing at room temperature, a white insoluble matter separated and rose to the surface. Therefore, prior to use, this additive was shaken thoroughly until it became homogeneous.

Production Example 7

A glass reactor equipped with a thermometer, a stirrer, a nitrogen inlet tube and a reflux condenser was charged with 141.0 parts of Softanol EP90150 (trademark, product of Nippon Shokubai) and 4.7 parts of maleic acid, and the charge was heated to 125±5° C. in a nitrogen atmosphere for melting and mixing up. Then, while maintaining the temperature at 125±5° C., 4.3 parts of acrylic acid and 1.0 part of tert-butylperoxy isopropyl carbonate (trademark Perbutyl I, product of Nippon Oil and Fat) were individually added dropwise continuously over 1 hour. Thereafter, stirring was continued at 125±5° C. for 1 hour, to give a graft polymer (graft polymer 7).

Water (82.4 parts) and 1.9 parts of an aqueous solution of sodium hydroxide (30% aqueous solution) were added to 44.9 parts of the graft polymer 7 to give an aqueous solution of the sodium salt of graft polymer 7. This is referred to as "additive 7".

The additive 7 obtained occurred as a pale yellow turbid solution having a pH of 7.1 and a solid content of 32.9%. Upon standing at room temperature, a white insoluble matter separated and rose to the surface. Therefore, prior to use, this additive was shaken thoroughly until it became homogeneous.

Production Example 8

A glass reactor equipped with a thermometer, a stirrer, a nitrogen inlet tube and a reflux condenser was charged with 120.0 parts of Softanol EP7085 (trademark, product of Nippon Shokubai; $C_{12-14}$ secondary alcohol-EO (7 moles)-PO (8.5 moles) adducts) and 15.5 parts of maleic acid, and the charge was heated to 125±5° C. in a nitrogen atmosphere for melting and mixing up. Then, while maintaining the temperature at 125±5° C., 14.5 parts of acrylic acid and 2.2 parts of tert-butylperoxy isopropyl carbonate (trademark Perbutyl I, product of Nippon Oil and Fat) were individually added dropwise continuously over 1 hour. Thereafter, stirring wag Continued at 125±5° C. for 1 hour, to give a graft polymer (graft polymer 8).

Water (51.2 parts) and 6.4 parts of an aqueous solution of sodium hydroxide (30% aqueous solution) were added to 25.1 parts of the graft polymer 8 to give an aqueous solution of the sodium salt of graft polymer 8. This is referred to as "additive 8".

The additive 8 obtained occurred as a pale yellow turbid solution having a pH of 7.3 and a solid content of 31.0%. Upon standing at room temperature, a white insoluble matter separated and rose to the surface. Therefore, prior to use, this additive was shaken thoroughly until it became homogeneous.

Example 7, Example 8 and Example 9

Using the additives obtained in the above manner, mortar kneading was performed and test pieces were prepared by the methods mentioned above and the specimens were evaluated for shrinkage reducing ability (cracking preventing ability) by measuring the changes in length. The results are shown in Table 4.

Comparative Example 15

No shrinkage reducing agent was added.

Comparative Example 16

Softanol EP95150 (trademark, product of Nippon Shokubai) was used for comparison (comparative additive 6).

Comparative Example 17

Softanol EP7085 (trademarks product of Nippon Shokubai) was used for comparison (comparative additive 7).

Comparative Example 18

The dehydration product derived from Tetraguard AS21 (trademark, product of Taiheiyo Cement) as obtained in Production Example 3 was used for comparison (comparative additive 1).

The results obtained in Comparative Examples 15 to 18 are shown in Table 4.

TABLE 4

| Ex. No. | Additives used | Addition amount (weight %) | Mortar evaluation result | | Change in length [μm] | | | | |
|---|---|---|---|---|---|---|---|---|---|
| | | | Flow value (mm) | Air content (volume %) | Day 0 | Day 3 | Day 7 | Day 14 | Day 21 | Day 28 |
| Ex. 7 | FC-900 | 0.12 | 162.5 | 1.8 | 0.0 | 11.4 | 34.4 | 49.0 | 72.9 | 85.5 |
| | Antiform | 0.50 | | | | | | | | |
| | Additive 6 | 0.50 | | | | | | | | |
| Ex. 8 | FC-900 | 0.12 | 173.0 | 5.2 | 0.0 | 11.9 | 35.4 | 50.5 | 69.4 | 78.5 |
| | Antiform | 0.50 | | | | | | | | |
| | Additive 7 | 0.50 | | | | | | | | |
| Ex. 9 | FC-900 | 0.12 | 189.0 | 6.5 | 0.0 | 15.4 | 30.4 | 57.0 | 71.4 | 79.5 |
| | Antiform | 0.50 | | | | | | | | |
| | Additive 8 | 0.50 | | | | | | | | |
| Compar. Ex. 15 | FC-900 | 0.12 | 126.0 | 0.0 | 0.0 | 22.9 | 67.4 | 92.5 | 126.4 | 141.5 |
| | Antiform | 0.50 | | | | | | | | |
| Compar. Ex. 16 | FC-900 | 0.12 | 124.0 | 1.8 | 0.0 | 20.4 | 67.9 | 95.0 | 117.9 | 128.0 |
| | Antiform | 0.50 | | | | | | | | |
| | Comparative additive 6 | 2.00 | | | | | | | | |
| Compar. Ex. 17 | FC-900 | 0.12 | 167.0 | 9.8 | 0.0 | 20.4 | 61.4 | 88.5 | 108.4 | 116.5 |
| | Antiform | 0.50 | | | | | | | | |
| | Comparative additive 7 | 2.00 | | | | | | | | |
| Compar. Ex. 18 | FC-900 | 0.12 | 118.0 | 0.0 | 0.0 | 23.4 | 51.9 | 85.5 | 107.9 | 120.5 |
| | Antiform | 0.50 | | | | | | | | |
| | Comparative additive 1 | 2.00 | | | | | | | | |

In Example 7 and Example 8, the additive 6 of the invention was used, which was synthesized starting with Softanol EP95150 (trademark, product of Nippon Shokubai) used in Comparative Example 16 and, in Example 9, the additive 7 of the invention was used, which was synthesized starting with Softanol EP7085 (trademark, product of Nippon Shokubai) used in Comparative Example 17. In Examples 7 to 9, the shrinkage was reduced as compared with Comparative Example 15 (no addition) or Comparative Example 18 in which a commercial shrinkage reducing agent (comparative additive 1) was used and, further, the results obtained indicate that the additives 6 and 7, even when used at an addition amount of not more than half as compared with Comparative Examples 16 and 17 in which the starting materials Softanol EP95150 and Softanol EP7085 were used, respectively, show a higher Shrinkage reducing effect than the effects obtained by using the starting materials as shrinkage reducing agents.

Production Example 9

A stainless steel pressure reactor equipped with a thermometer, a stirrer, a nitrogen inlet tube and a pressure gage was charged with 177,3 parts of 1,6-hexanediol (product of Wako Pure Chemical Industries) and 0.3 part of sodium hydroxide. The pressure reactor inside was purged with nitrogen with stirring, and the pressure reactor inside was heated to 100±5° C. Then, 493.5 parts of ethylene oxide was introduced into the reactor at a temperature of 115±7° C. and a safety pressure of $2.0 \times 10^{-1}$ to $7.0 \times 10^{-1}$ MPa. After maturation, the volatile matter was removed to give an intermediate (intermediate c), namely a 1,6-hexanediol-ethylene oxide adduct.

The molecular weight of intermediate c was determined based on its hydroxyl value and found to be 444.1. Thus, the average number of moles of ethylene oxide added to 1,6-hexanediol was calculated at 7.4.

A glass reactor equipped with a thermometer, a stirrer, a nitrogen inlet tube and a reflux condenser was charged with 120.0 parts of the intermediate c and 15.5 parts of maleic acid, and the charge was heated to 125±5° C. in a nitrogen atmosphere for melting and mixing up. Then, while maintaining the temperature at 125±5° C., 14.5 parts of acrylic acid and 2.5 parts of di-tert-butyl peroxide (trademark Perbutyl D, product of Nippon Oil and Fat) were individually added dropwise continuously over 1 hour. Thereafter, stirring was continued at 125±5° C. for 1 hour, to give a graft polymer (graft polymer 9).

Addition of 68.2 parts of water and 8.7 parts of an aqueous solution of sodium hydroxide (30% aqueous solution) to 34.7 parts of the graft polymer 9 gave an aqueous solution of the sodium salt of graft polymer 9. This is referred to as "additive 9".

The additive 9 obtained occurred as a pale yellow transparent solution with a pH of 7.1 and a solid content of 32.1%. It did not separate for at least 1 month at room temperature.

Production Example 10

A stainless steel pressure reactor equipped with a thermometer, a stirrer, a nitrogen inlet tube and a pressure gage was charged with 92.1 parts of glycerol (product of Wako Pure Chemical Industries) and 0.1 part of sodium hydroxide. The pressure reactor inside was purged with nitrogen with stirring, and the pressure reactor inside was heated to 100±5° C. Then, 264.6 parts of ethylene oxide was introduced into the reactor at a safety pressure of $3.4 \times 10^{-1}$ to $7.0 \times 10^{-1}$ MPa and at a temperature of 112.5±7.5° C. for the initial 50 minutes and thereafter at 145±100° C. After maturation, the volatile matter was removed to give an intermediate (intermediate d), namely a glycerol-ethylene oxide adduct.

The molecular weight of intermediate d was determined based on its hydroxyl value and found to be 181.4. Thus, the average number of ethylene oxide added to glycerol was calculated at 2.0.

A glass reactor equipped with a thermometer, a stirrer, a nitrogen inlet tube and a reflux condenser was charged with 120.0 parts of the intermediate d and 15.5 parts of maleic acid, and the charge was heated to 125±5° C. in a nitrogen atmosphere for melting and mixing up. Then, while maintaining the temperature at 125±5° C., 14.5 parts of acrylic acid and 3.3 parts of tert-butylperoxy isopropyl carbonate (trademark Perbutyl I, product of Nippon Oil and Fat) were individually added dropwise continuously over 1 hour. Thereafter, stirring was continued at 125±5° C. for 1 hour, to give a graft polymer (graft polymer 10).

Addition of 69.2 parts of water and 6.6 parts of an aqueous solution of sodium hydroxide (30% aqueous solution) to 30.4 parts of the graft polymer 10 gave an aqueous solution of the sodium salt of graft polymer 10. This is referred to as "additive 10".

The additive 10 obtained occurred as a yellowish brown transparent solution with a pH of 6.9 and a solid content of 29.2%. It did not separate for at least 1 month at room temperature.

Production Example 11

A glass reactor equipped with a thermometer, a stirrer, a nitrogen inlet tube and a reflux condenser was charged with 129.0 parts of Jeffamine M-2005 (trademark, product of San Techno Chemical; amine-terminated polyether, average molecular weight 2,000, EO/PO=5/29 (mole ratio)) and 10.9 parts of maleic acid, and the charge was heated to 125±5° C. in a nitrogen atmosphere for melting and mixing up. Then, while maintaining the temperature at 125±5° C., 10.1 parts of acrylic acid and 1.8 parts of di-tert-butyl peroxide (trademark Perbutyl D, product of Nippon Oil and Fat) were individually added dropwise continuously over 1 hour. Thereafter, stirring was continued at 125±5° C. for 1 hour, to give a graft polymer (graft polymer 11).

Addition of 93.5 parts of water and 10.1 parts of an aqueous solution of sodium hydroxide (30% aqueous solution) to 51.6 parts of the graft polymer 11 gave an aqueous solution of the sodium salt of graft polymer 11. This is referred to as "additive 11".

The additive 11 obtained occurred as a yellowish brown turbid solution with a pH of 7.2 and a solid content of 34.1%. Upon standing at room temperature, a white insoluble matter separated and rose to the surface. Therefore, prior to use, this additive was shaken thoroughly until it became homogeneous.

Examples 10 to 12

Using the additives obtained in the above manner, mortar kneading was performed and test pieces were prepared by the methods mentioned above and the specimens were evaluated for shrinkage reducing ability (cracking preventing ability) by measuring the changes in length. The results are shown in Table 5.

Comparative Example 19

No shrinkage reducing agent was added.

Comparative Example 20

The intermediate c obtained in Production Example 9 was used for comparison (comparative additive 8).

Comparative Example 21

The intermediate d obtained in Production Example 10 was used for comparison (comparative additive 9).

Comparative Example 22

Jeffamine M-2005 (trademark, product of San Techno Chemical) was used for comparison (comparative additive 10).

Comparative Example 23

The dehydration product derived from Tetraguard AS21 (trademark, product of Taiheiyo Cement) as obtained in Production Example 3 was used for comparison (comparative additive 1).

The results obtained in Comparative Examples 19 to 23 are shown in Table 5.

TABLE 5

| Ex. No. | Additives used | Addition amount (weight %) | Mortar evaluation result Flow value (mm) | Air content (volume %) | Change in length [μm] Day 0 | Day 3 | Day 7 | Day 14 | Day 21 | Day 28 |
|---|---|---|---|---|---|---|---|---|---|---|
| Ex. 10 | FC-900 | 0.12 | 145.0 | 0.0 | 0.0 | 18.0 | 40.2 | 82.8 | 90.5 | 111.5 |
|  | Antiform | 0.50 |  |  |  |  |  |  |  |  |
|  | Additive 9 | 0.80 |  |  |  |  |  |  |  |  |
| Ex. 11 | FC-900 | 0.12 | 173.0 | 0.0 | 0.0 | 14.0 | 34.7 | 73.3 | 83.5 | 90.3 |
|  | Antiform | 0.50 |  |  |  |  |  |  |  |  |
|  | Additive 10 | 0.50 |  |  |  |  |  |  |  |  |
| Ex. 12 | FC-900 | 0.12 | 156.0 | 2.6 | 0.0 | 12.0 | 45.2 | 72.3 | 99.5 | 114.0 |
|  | Antiform | 0.50 |  |  |  |  |  |  |  |  |
|  | Additive 11 | 0.50 |  |  |  |  |  |  |  |  |
| Compar. Ex. 19 | FC-900 | 0.12 | 122.0 | 0.0 | 0.0 | 17.0 | 54.2 | 92.8 | 118.0 | 132.5 |
|  | Antiform | 0.50 |  |  |  |  |  |  |  |  |
| Compar. Ex. 20 | FC-900 | 0.12 | 122.5 | 0.0 | 0.0 | 9.0 | 38.2 | 69.3 | 93.0 | 107.5 |
|  | Antiform | 0.50 |  |  |  |  |  |  |  |  |
|  | Comparative additive 8 | 2.00 |  |  |  |  |  |  |  |  |
| Compar. Ex. 21 | FC-900 | 0.12 | 115.5 | 0.0 | 0.0 | 18.5 | 49.2 | 80.3 | 108.0 | 125.5 |
|  | Antiform | 0.50 |  |  |  |  |  |  |  |  |
|  | Comparative additive 9 | 2.00 |  |  |  |  |  |  |  |  |
| Compar. | FC-900 | 0.12 | 112.5 | 0.0 | 0.0 | 15.0 | 40.2 | 82.8 | 90.5 | 111.5 |

TABLE 5-continued

| | | | Mortar evaluation result | | | | | | |
|---|---|---|---|---|---|---|---|---|---|
| | | Addition amount | Flow value | Air content | Change in length [μm] | | | | |
| Ex. No. | Additives used | (weight %) | (mm) | (volume %) | Day 0 | Day 3 | Day 7 | Day 14 | Day 21 | Day 28 |
| Ex. 22 | Antiform | 0.50 | | | | | | | | |
| | Comparative additive 10 | 2.00 | | | | | | | | |
| Compar. Ex. 23 | FC-900 | 0.12 | 120.0 | 0.0 | 0.0 | 15.5 | 42.2 | 70.8 | 97.5 | 113.0 |
| | Antiform | 0.50 | | | | | | | | |
| | Comparative additive 1 | 2.00 | | | | | | | | |

In Example 10, the additive 9 of the invention was used, which was synthesized starting with the intermediate c used in Comparative Example 20 and, in Example 11, the additive 10 of the invention was used, which was synthesized starting with the intermediate d used in Comparative Example 21. In Example 12, the additive 11 of the invention was used, which was synthesized starting with Jeffamine M-2005 (trademark, product of San Techno Chemical) used in Comparative Example 22. In Examples 10 to 12, the shrinkage was reduced as compared with Comparative Example 19 (no addition) or Comparative Example 23 in which a commercial shrinkage reducing agent (comparative additive 1) was used and, further, the results obtained indicate that the additives 9, 10 and 11, even when used at an addition amount of not more than half as compared with Comparative Examples 20 to 22 in which the starting materials, namely the intermediate c, intermediate d and Jeffamine M-2005 (trademark, product of San Techno Chemical), were used, respectively, show a higher shrinkage reducing effect than the effects obtained by using the starting materials as shrinkage reducing agents.

(Simplified Water Reduction Evaluation)

Ordinary portland cement (400 g, product of Taiheiyo Cement) and 800 g of standard Toyoura sand were dry-mixed in a Hobart type mortar mixer (model N-50 (trademark), product of Hobart) for 30 seconds and, then, 240 g of an additive mixture prepared by diluting the additives specified in Table 2, each weighed as specified in Table 2, with water, followed by 3 minutes of kneading at an intermediate speed to give a mortar sample.

The mortar obtained was immediately filled into a stainless steel hollow cylinder with an inside diameter of 53.5 mm and a height of 50 mm as placed on a horizontal table to the top level of the cylinder, this cylinder was gently lifted up, and the major axis and minor axis of the mortar spread over the table were measured with vernier calipers. The mean value thereof was reported as the mortar flow value. When the amount of air entrained is large, flow and shrinkage values are apparently exaggerated and therefore the amount of air entrained should be constant. Thus, an appropriate amount of an air entraining agent (e.g. Yamaso Kagaku's Vinsol (trademark)) or a defoaming agent was used.

The amount of air was calculated based on the mortar volume and weight and the ratio of the materials used. The results obtained are shown in Table 6.

TABLE 6

| Ex. No. | Additives used | Addition amount* (wt. %) | Flow value (mm) | Air content (vol. %) |
|---|---|---|---|---|
| Ex. 13 | Additive 1 | 0.5 | 74 | 16.8 |
| Ex. 14 | Additive 3 | 0.5 | 68 | 9.8 |
| | AE agent | 0.1 | | |
| Compar. Ex. 24 | AE and high-range water reducing agent | 0.12 | 110 | 9.7 |

*The addition amounts are on the solid content basis relative to cement.

The AE agent used was Vinsol (product of Yamaso Kagaku).

Table 7 shows concrete mix proportions. The amount of the air entraining and high-range water reducing agent required to attain an equal slump value upon formulation change from the admixture-free plain concrete (formulation 1) to the formulation with the unit water content being reduced by 19% (formulation 2) was 0.12%. The fine aggregate used was Oi river system land sand (specific gravity 2.60, fineness modulus=2.70), the coarse aggregate used was crushed Oume stone (specific gravity 2.65, maximum size 20 mm) and the cement used was Taiheiyo Cement's ordinary portland cement (specific gravity 3.16).

TABLE 7

| | | | Quantity per unit volume of concrete (kg/m³) | | | |
|---|---|---|---|---|---|---|
| Formulation | W/C (%) | s/a (%) | Cement | Water | Fine aggregate | Coarse aggregate |
| 1 | 65.6 | 50 | 320 | 210 | 883 | 869 |
| 2 | 53.8 | 49 | 320 | 172 | 875 | 897 |

In Comparative Example 24, Aqualoc FC-900 was used as an air entraining and high-range water reducing agent in an amount of 0.12% (relative to cement). For reducing the unit water content in concrete by 18%, 0.12% (relative to cement) of Aqualoc FC-900 was required. When this addition amount was applied to the above-mentioned mortar, a flow value of 110 mm and an air content of 11±2% by volume were attained and homogeneous mortar was obtained.

In Example 13, the water reducing ability of the additive 1 was evaluated by the simplified mortar test. When the additive 1 was used in an amount of 0.5% (relative to cement), the flow was only 74 mm and it was thus revealed that the addition amount required to attain 18% water reduction is not less than 0.5% or that the additive cannot attain 18% water reduction at all.

In Example 14, the water reducing ability of the additive 3 was evaluated by the simplified mortar test. When the additive 3 was used in an amount of 0.5% (relative to cement), the flow was only 68 mm and it was thus revealed that the addition amount required to attain 18% water reduction is not less than 0.5% or that the additive cannot attain 18% water reduction at all.

Based on these data, it was confirmed that the additives of the present invention produce an excellent shrinkage reducing effect but have no water reducing ability or, if they have such ability, the ability will be slight.

What is claimed is:

1. A composition for using as a shrinkage reducing agent for hydraulic materials which comprises at least one polymer selected from the group consisting of
   (a) a polymer having a structure derived from the residue of a compound containing 2 to 30 carbon atoms and one active hydrogen atom by the binding thereto of one oxyalkylene chain having a carboxyl-containing side chain,
   (b) a polymer having a structure derived from the residue of a compound containing 4 to 30 carbon atoms and two active hydrogen atoms by the binding thereto of at least one oxyalkylene chain having a carboxyl-containing side chain,
   (c) a polymer having a structure derived from the residue of a compound containing 1 to 30 carbon atoms and at least three active hydrogen atoms by the binding thereto of at least one oxyalkylene chain having a carboxyl-containing side chain
   and (d) a polymer having a structure derived from the residue of an amine by the binding thereto of one oxyalkylene chain having a carboxyl-containing side chain, is produced by using polyether as the starting material, and satisfies that the addition amount required for attaining a certain shrinkage reducing effect is not more than 60 percent of the addition amount required when said polyether is used as the shrinkage reducing agent, and that the addition amount required for reducing the unit water content by 18% as compared with the unit water content in plain mortar or plain concrete is not less than 0.5% by weight relative to cement.

2. The composition for using as a shrinkage reducing agent for hydraulic materials according to claim 1, wherein said oxyalkylene chain having a carboxyl-containing side chain has a repeating unit represented by the general formula (1):

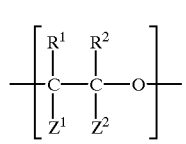

(1)

wherein $R^1$ and $R^2$ are the same or different and each represents a hydrogen atom, a hydrocarbon group containing 1 to 18 carbon atoms or a carboxyl-containing side chain, $Z^1$ and $Z^2$ are the same or different and each represents a hydrogen atom or a carboxyl-containing side chain, provided that the carboxyl-containing side chain has a structure resulting from polymerization of an ethylenically unsaturated monomer component comprising an unsaturated carboxylic acid monomer, said repeating unit comprising a repeating unit having a carboxyl-containing side chain.

3. The composition for using as a shrinkage reducing agent for hydraulic materials according to claim 2, wherein said ethylenically unsaturated monomer component comprises an α, β-unsaturated dicarboxylic acid monomer and (meth)acrylic acid.

4. A method of producing a composition for using as a shrinkage reducing agent for hydraulic materials according to claim 1, which comprises a step of producing a polymer by graft polymerization of an ethylenically unsaturated monomer component onto a polyether compound, said ethylenically unsaturated monomer component comprising an unsaturated carboxylic acid monomer.

5. The method of producing a composition for using as a shrinkage reducing agent for hydraulic materials according to claim 4, wherein the polyether compound comprises at least one member selected from the group consisting of alkylene oxide adducts of a compound containing 2 to 30 carbon atoms and one active hydrogen atom, alkylene oxide adducts of a compound containing 4 to 30 carbon atoms and two active hydrogen atoms, alkylene oxide adducts of a compound containing 1 to 30 carbon atoms and at least three active hydrogen atoms and alkylene oxide adducts of an amine.

6. An additive composition for hydraulic materials comprising a shrinkage reducing agent for hydraulic materials and, an air entraining and water reducing agent, wherein said shrinkage reducing agent for hydraulic materials comprises at least one polymer selected from the group consisting of (A) a polymer having a structure derived from the residue of a compound containing 1 to 30 carbon atoms and one active hydrogen atom by the binding thereto of the oxalkylene chain having a carboxyl-containing side chain, (B) a polymer having a structure derived from the residue of a compound containing 1 to 30 carbon atoms and two active hydrogen atoms by the binding thereto of at least one oxyalkylene chain having a carboxyl-containing side chain, (C) a polymer having a structure derived from the residue of a compound containing 1 to 30 carbon atoms and at least three active hydrogen atoms by the binding thereto of at least one oxyalkylene chain having a carboxyl-containing side chain and (D) a polymer having a structure derived from the residue of an amine by the binding thereto oxyalkylene having a carboxyl-containing side chain.

7. The additive composition for hydraulic materials according to claim 6, wherein the ratio of said shrinkage reducing agent for hydraulic materials/said air entraining and water reducing agent is 1/100 to 50/1 by weight on the solid matter basis.

8. The additive composition for hydraulic materials according to claim 6, wherein said air entraining and water reducing agent comprises at least one type agent selected from the group consisting of ligninsulfonic acid type, polycarboxylic acid type, naphthalene type, melamine type and aminosulfonic acid type.

9. The additive composition for hydraulic materials according to claim 6, wherein said air entraining and water reducing agent comprises polycarboxylic acid type agent.

* * * * *